United States Patent [19]

Marks

[11] 4,442,019

[45] Apr. 10, 1984

[54] ELECTROORDERED DIPOLE SUSPENSION

[76] Inventor: Alvin M. Marks, Bigelow Rd., Athol, Mass. 01331

[21] Appl. No.: 222,377

[22] Filed: Jan. 5, 1981

Related U.S. Application Data

[63] Continuation-in-part of Ser. No. 909,944, May 26, 1978, abandoned.

[51] Int. Cl.$^3$ .................. B01J 13/00; G02F 1/01; G05D 25/00
[52] U.S. Cl. .................. 252/309; 350/267; 350/362
[58] Field of Search .................. 252/309; 350/267, 362

[56] References Cited

U.S. PATENT DOCUMENTS

| | | |
|---|---|---|
| 3,257,903 | 6/1966 | Marks . |
| 3,505,231 | 4/1970 | Oliphant . |
| 3,512,876 | 5/1970 | Marks . |
| 3,527,525 | 9/1970 | Marks . |
| 3,594,065 | 7/1971 | Marks . |
| 3,773,684 | 11/1973 | Marks ................................ 350/267 |
| 4,025,163 | 5/1977 | Saxe et al. ........................ 350/362 |
| 4,164,365 | 8/1979 | Saxe et al. ........................ 350/362 |

FOREIGN PATENT DOCUMENTS 525956  9/1940  United Kingdom .

*Primary Examiner*—Allan Lieberman

[57] ABSTRACT

An electrodichroic composition of matter comprising a concentrated suspension of submicron conductive particles in an insulating fluid which, upon the application of a strong electric field to the suspension, exhibits a new electroordering effect with greatly improved electrooptical properties. A novel process is described for increasing the resistivity of a dipole suspension. Improved electrooptical panels and displays can be made with compositions which comprise a suspension of submicron asymmetric particles of graphite, molybdenum disulfide, metals such as aluminum, or dichroic crystals such as Herapathite in an insulating fluid.

31 Claims, 20 Drawing Figures

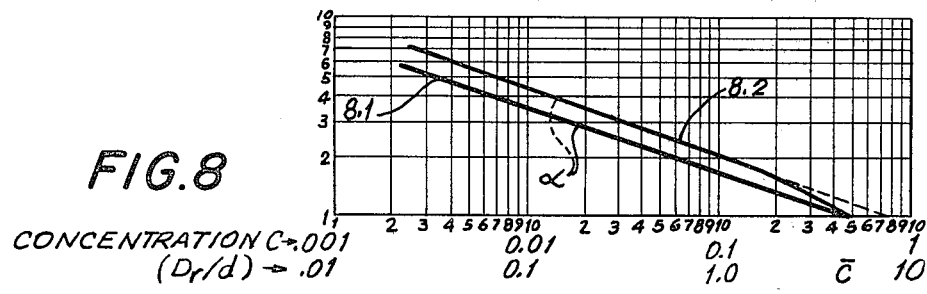
FIG. 8 — GRAPHITE SUSPENSION CONCENTRATION C VS. α
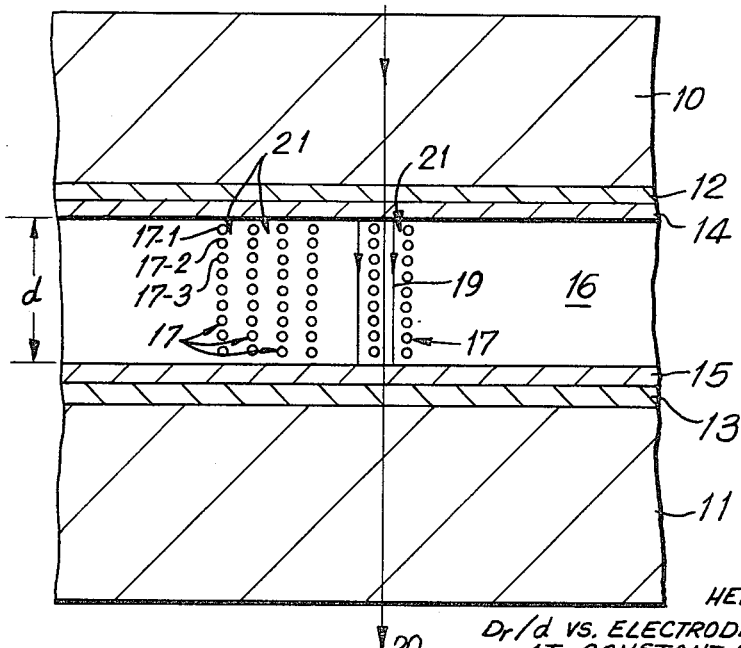
FIG. 9
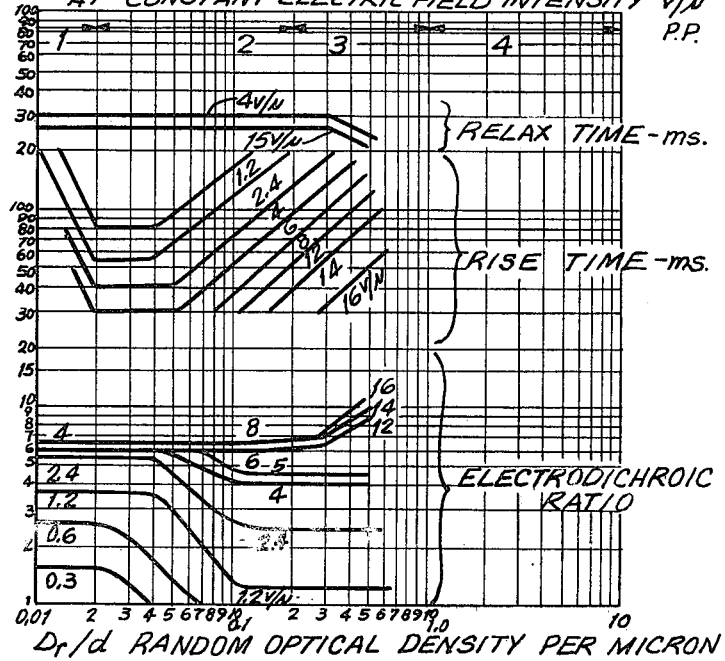
FIG. 11 — HERAPATHITE DIPOLE SUSPENSION $D_r/d$ VS. ELECTRODICHROIC RATIO, RISE & RELAX TIMES AT CONSTANT ELECTRIC FIELD INTENSITY v/μ

FIG. 17

GRAPHITE SUSPENSION— ELECTRODICHROIC RATIO VS. ELECTRIC FIELD INTENSITY FOR VARIOUS LAYER THICKNESSES AND RANDOM OPTICAL DENSITY PER MICRONS

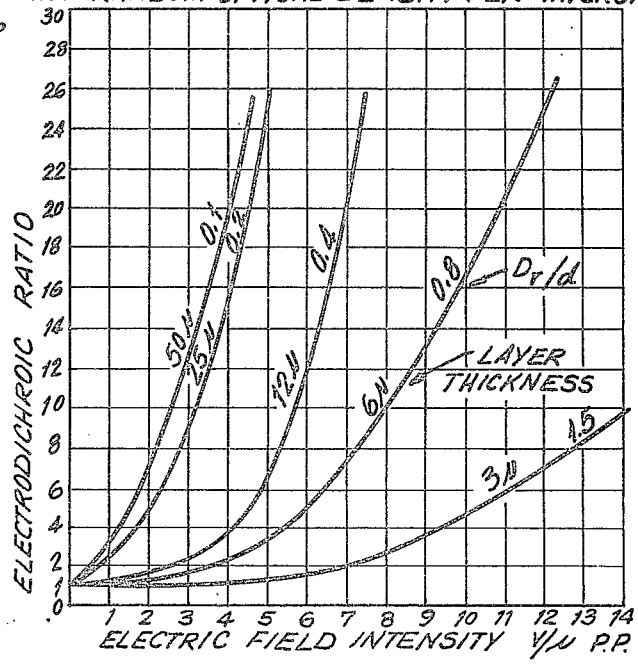

FIG. 18
GRAPHITE SUSPENSION ELECTRODICHROIC RATIO $Q_{rz}$ VS. DIPOLE LAYER THICKNESS $d$ IN MICRONS

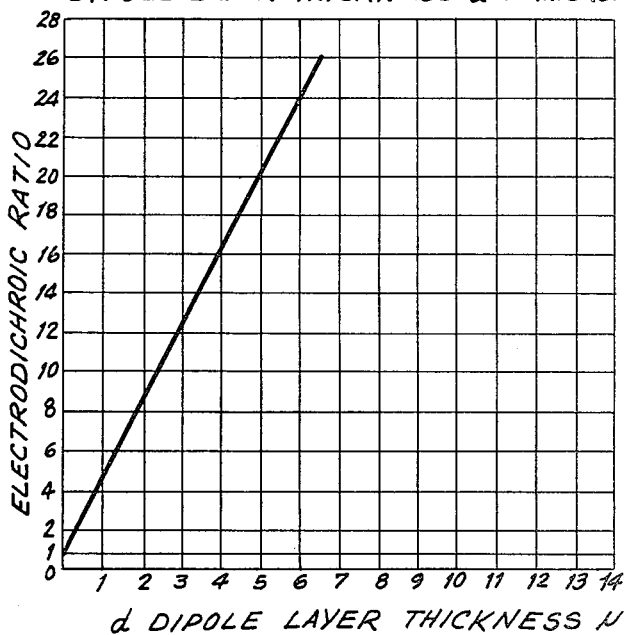

FIG. 19
GRAPHITE SUSPENSION % TRANSMITTANCE VS. VOLTAGE PEAK-TO-PEAK $10^3$ Hz SINE WAVE APPLIED ACROSS 12 MICRON THICKNESS LAYER GRAPHITE SUSPENSION OF RANDOM OPTICAL DENSITY=4.8 SHOWING TRANSMISSION THRESHHOLD AT V/2 = 50 VOLTS P.P.

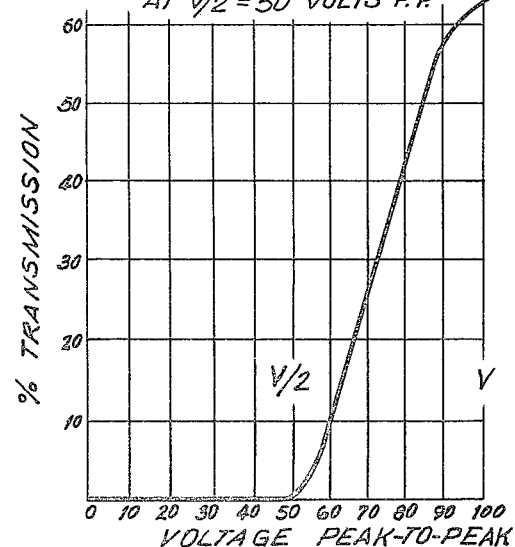

FIG. 20

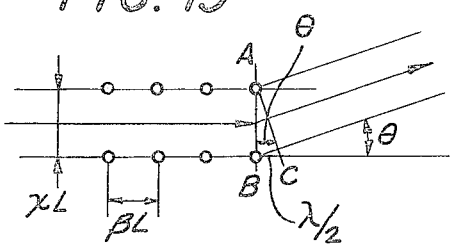

ELECTROORDERED DIPOLE SUSPENSION

This invention, originally filed on May 30, 1973 as Ser. No. 365,137 was inadvertently abondoned, and refiled with new material as Ser. No. 909,944 on May 26, 1978, and the present specification is a continuation in part thereof; serial specification Ser. No. 909,944 was thereafter abandoned.

This invention relates to improvements in dipolar suspensions, particularly those which manifest electrooptical properties, as described in U.S. Pat. No. 3,512,876; and to electrodichroic compositions of matter comprising conductive dipole particles in concentrated suspensions which exhibit a new "electroordering effect" and to electrooptic devices incorporating such electrodichroic compositions.

Concentrated dipolar suspensions in an insulating fluid exhibit new and previously unsuspended properties, and in particular, extraordinary electrooptical properties of great utility.

The extraordinary improvements resulting from the use of concentrated dipolar particle suspensions comprise more than an order of magnitude increase in the electrodichroic ratio, and several orders of magnitude in decreased rise time and decreased relaxation time. Moreover, there is a greatly increased stability against settling and coagulation, inactivated, or on repeated activation by an electric field. Other unique electrophysical effects will be described more fully hereinafter.

Observations on conductive particle dipole suspensions in insulating fluids showed that some inactivated suspensions with no electric field applied thereto, upon standing only, appeared permanently stable; while other inactivated suspensions settled or coagulated. Some of the suspensions were stable when inactivated and remained stable when activated by an electric field, while others coagulated. No consistent theory existed by which this behavior could be explained or controlled.

BACKGROUND OF THE INVENTION

In the prior art, metal suspensions in insulating fluids were studied as a factor in the electrical breakdown of insulating fluids. A spark discharge momentarily appears as metal contacts immersed in oil, and carrying an electric current, are separated. Metal particle suspensions are produced by condensation of metal vapors from the spark discharge in the oil, wherein the metal particle are usually spherical in shape. Prior art in this field is summarized in the book *Electrical Breakdown in Insulating Fluids*, by J. A. Kok, Interscience 1961. In this book, Coehn's Rule is given, which states that high permittivity materials (metals, carbon, etc.) in insulating fluids become positively charged. This occurs by the emission of electrons from the materials into the fluid. It is stated that suspensions of small particles, between 50 and 3000 Å are stable, but that larger particles are not stable and flocculate and settle. The stability of metal suspensions in insulating fluids is related to surface-active agents, such as soaps, which surround the metal and form a charged double layer. The charged atmospheres of the double layers from a repelling barrier which prevents the metal particles from contacting each other. The thickness of the double layer is said to be about 20 Å, and the distance over which the repulsion barrier acts not more than 100 Å. In an electric field, metal or carbon particles suspended in a fluid were shown to form into lines parallel to the field direction and were termed "pearl strings" herein termed "particle strings". Experimentally, metals, graphite, molybdenum disulfide, and Herapathite particles were found to have positive, negative or no charges in an insulating fluid, depending on the ionic and chemical nature of the fluid, and the particle chemistry and size.

In the prior art, graphite suspensions were tested as electrodichroic fluids but were not successful because the electrooptical properties of these graphite suspensions were of a small magnitude. Moreover, the stability was unsatisfactory for commercial applications because the existence of the electroordered structure, and the critical ranges of parameters needed for its formation, herein disclosed, were previously unknown.

SUMMARY OF THE INVENTION

Accordingly, it is the primary object of the present invention to provide novel electrodichroic compositions of matter exhibiting a new electroordering effect which provides improved electrooptical properties.

Another object of this invention is to provide a substantially inorganic stable electrodichroic composition of matter exhibiting an electroordering effect which provides improved electrooptical properties.

A further object of this invention is to provide a new process for increasing the resistivity of a particle suspension in a fluid.

A still further object of this invention is to provide a process for providing a suspension of particles within a narrow size range.

A still further object of this invention is to provide an electrooptical panel utilizing an electrodichroic composition of matter exhibiting the electroordering effect and which has a transmission range from almost opaque to almost clear and is neutral in shade; being absorbent from the ultraviolet to the near infrared, and wherein the rise and relax times are in the low millisecond range.

It is yet another object of this invention to provide an electrooptic reflective display exhibiting high visible contrast and operative at low voltage and low power dissipation.

The mks system of units is consistently used where possible. The cgs system is used as noted. $10^{-6}$ m (meter)$=1\mu$ (micron)$=10^4$ Å (angstroms). Symbols are defined in the "Table of Symbols".

Most of the terminology employed herein was previously defined in my aforementioned U.S. Pat. No. 3,512,876 and new terminology is defined hereinafter.

A dilute suspension is defined as one in which the conductive dipole particles are so far apart that there is little or no interaction in an electric field. In this case the dipoles are said to be in the "far" electromagnetic field of each other.

A concentrated suspension is defined as one in which the conductive dipole particles are sufficiently close to interact in an electric field. The particles cannot approach closer than a minimum interparticle distance $\beta L$, where $\beta > 1$. At this distance the space $(\beta-1)$ L between particles may be from several particle lengths to a fraction of the particle length L, and repulsion forces predominate. The smaller this distance, the greater the repulsion force. In this case the dipoles are said to be in the "near" electromagnetic field of each other.

The Maximum Concentration $\bar{C}$ and the Maximum Optical Density per Unit Suspension Layer Thickness ($\overline{D}_r/d$) is approached as the distance between particles→0; that is $\beta$→1.

A dipole particle is defined as an asymmetric conductive particle having a major length of $L=m(\lambda/2n)$. Dipole particles are further defined by their size specified by various ranges of values for m:

| | |
|---|---|
| Subresonant Dipole | m < 1 |
| Resonant Dipole | m = 1 |
| Near-Resonant Dipole | ½ < m < 3/2; which includes "resonant". |
| Multiresonant Dipole | 10 > m > 1 |

Remanence is a greatly increased relax time of a particle alignment due to the retention of charges on conductive particles. Conductive particles suspended in an insulating fluid in an electric field may become charged temporarily or permanently by emitting electrons into the fluid.

A "particle string" is a group of conductive particles aligned parallel to the electric field lines and held in position by the electric field. The particles cannot approach each other closer than a minimum distance determined by an electricl repulsion force between the particles which increases as the space between the particles decreases. The repulsion force may be due to like charged on the particles and/or an electrical double layer surrounding each particle.

An Electroordered Array comprises spaced columns of particle strings, formed in a concentrated suspension by a strong electrical field. A well formed Electroordered Array is one in which all the particles are aligned into particle strings and no unattached particles remain between the particle strings.

The Electroordering Effect is the physical and electrooptical properties of an electroordered particle array in an electric field.

The electrooptical properties of dipolar particle suspensions are augmented by several orders of magnitude by the electroordering effect which occurs under the following conditions:

(1) Particle Size

Submicron conductive asymmetric particles in the subresonant to near-resonant range 1000 Å to 3000 Å, and 50 to 200 Å thick, preferably almost uniform in size, with few or no larger particles, have a low millisecond relax time. Multiresonant particles form Electroordered Arrays, are remanent, and have a 1 to $10^4$ second relax time.

(2) Particle Suspension Concentration 0.5 to 15 weight %.

(3) Random Optical Density 0.05 to 1.5/$\mu$ (4) Layer Thickness 2 to 100$\mu$ (5) Electric Field Intensity 0.1 to 20 volts peak-to-peak/$\mu$, depending on the particle conductivity and shape factor.

(6) A fluid Medium of Preferably:

6.1—Resistivity $\geq 10^{12}$ ohm-cm.
   6.2—Small Dielectric Constant $\leq 2.30$
   6.3—Large Breakdown Electric Field $> 20$ v/$\mu$
   6.4—Large dispersibility for the particle
   6.5—Large Density $\geq 1.60$ gms/cm$^3$
   6.6—Low viscosity < 10 centipoise
   6.7—A freezing point of $> -40°$ C. to a boiling point of $> 200°$ C.

BRIEF DESCRIPTION OF THE DRAWINGS

The new compositions of matter, processes for manufacture, and electrooptical devices utilizing such compositions will become more apparent from the detail discussion hereinafter considered in conjunction with the accompanying drawings, wherein:

FIG. 8 is a log-log plot of Concentration vs. $\alpha$.

FIG. 9 depicts a section through an electrooptical variable light transmission cell in which an electric field is applied to the electrooptical fluid layer, and in which an Electroordered Array of particles is illustrated.

FIGS. 11 to 14 depict plots of data for dipole suspensions on log-log graphs of Random Optical Density per micron of layer thickness vs. Electrodichroic Ratio, Rise Time and Relax Time; except that in FIG. 14, Rise and Relax Times are shown separately. A family of curves is shown at various constant values of Electrical Field Intensity. Also shown is ($D_r$/d) vs. $E_z$ for a constant value of $Q_{rz}$.

FIG. 11 is for an Herapathite rod suspension.

FIG. 12 is for an aluminum flake suspension.

FIG. 13 is for a molybdenum disulfide flake suspension.

FIG. 14 is for a graphite flake suspension.

FIG. 17 is plotted for the same data as FIGS. 14 to 16, inclusive, as a family of curves for the Electrodichroic Ratio vs. Electric Field Intensity on a linear-linear graph for various constant values of $(D_r/d)$ and layer thickness d in microns.

FIG. 18 is a linear-linear graph for the same data as in FIGS. 14 to 17, depicting Maximum Electrodichroic Ratio vs. Layer Thickness in Microns.

FIG. 19 illustrates a threshold effect with a graphite flake suspension, depicting PerCent Transmittance vs. Peak-to-Peak Voltage across a layer.

FIG. 20 is a diagram illustrating the diffraction of light by a well-formed electroordered array in a layer.

Figure 1:
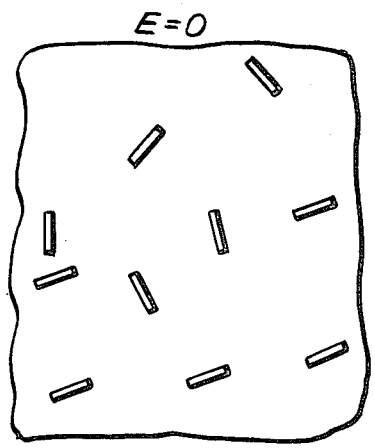
FIG. 1 illustrates a dipole rod particle "dilute" suspension in which the particle number density per unit volume is small, the electric field is zero, and the particles have a random orientation.

Experimental observations on dilute and on concentrated dipole suspensions are described hereinafter to illustrate the substantially different, new and advantageous properties of the latter.

Dilute metal suspensions, such as aluminum or chromium, which contain resonant or subresonant dipole flakes about 2000 Å long and 50 to 200 Å in thickness, are stable when inactivated and do not coagulate or settle; however, upon activation, coagulation may occur. The Electrodichroic Ratio is small, only about 1.5. Dilute suspensions containing larger multiresonant flakes, from 0.3 to 1.5$\mu$ long and 70 Å thick, had a useful Electrodichroic Ratio of 5 to 10, or more; however, these larger flakes settled, and suspensions were not clear.

From these experiments with dilute suspensions of metal flake particles, there appeared to be a hopeless dilemma, that is, multiresonant flake particles having a large Electrodichroic Ratio of 5 to 10 always settled while resonant and subresonant flake particles which remained suspended had too small an Electrodichroic Ratio to be useful (about 1.5).

An aluminum flake suspension stored in a stoppered bottle for 2 years had settled and although the particles did not settle completely to a solid, there remained on the bottom of the bottle a dark viscous fluid-mass which was similar to a dark, heavy oil with clear fluid on top. This dark oily fluid which comprised an aluminum flake concentrated dipole suspension was placed in a cell having a layer thickness d=25$\mu$ between transparent electrodes on glass. It formed a neutral dark blue fluid layer with an Optical Density $D_r \approx 3$, $(D_r/d)=0.12$ Optical Density per $\mu$ and had an Electrodichroic Ratio of about 5. It was repeatedly reversible and permanently stable.

After settling for several days, a dilute suspension of multiresonant chromium rod dipole particles sedimented to a concentrated suspension having the appearance of a dark neutral color oily fluid which was electrooptically active and permanently stable. The multiresonant chromium rod particles had a width of about 0.1$\mu$ and lengths from 0.4 to 1$\mu$. An electrodichroic ratio of about 7.5 was obtained with a layer thickness d=5 to 25$\mu$, and with $(D_r/d) \approx 0.2$ Random Optical Density per $\mu$. The relaxation time greatly decreased as the particle concentration increased.

An Herapathite dipole fluid suspension in a flat cell, on standing for 30 days, settled into four distinct suspension layers which were successively darker and more concentrated, although the smallest particles did not settle at all. A concentrated Herapathite dipole suspension in a cell having a layer thickness $d \approx 25\mu$ and an Optical Density of 3; or $(D_r/d) \approx 0.12$ does not settle and is permanently stable.

The distinct layers observed on the settling of dilute particle suspensions of Herapathite have also been observed with dilute suspensions of other conductive particles; for example: aluminum, chromium, graphite and molybdenum disulfide.

These distinct layers formed in a particle suspension contain quantum charged particles. These distinct layers comprise a new state of matter, wherein the dipole particles remain apart at a critical distance and do not settle further because the electrical repulsion force between the particles having the same size range and same number of charges balances the net settling force of gravity and buoyancy on these particles which would otherwise sediment.

Conductive particles subjected to a strong electric field in an insulating fluid reach a maximum positive charge by emission of electrons into the fluid from a point or edge of the particle where the electric field concentrates to a limit determined by the electrical breakdown strength of the fluid. When the applied electric field is turned off, some of the electrons may not return from the fluid to the particle thereby leaving a residual positive charge on the particle. A conductive particle which is smaller than a certain size and is suspended in an insulating fluid, will not sustain even one charge. In the next greater size range, a conductive particle will sustain only one charge per particle and in the next greater size range will sustain two charges per particle, etc.

To retain 1, 2, 3 or more electric charges, the particles must be in a size range from about 0.2 to 1.0$\mu$. For these larger particles with electric charges of 1, 2, or 3 per particle, the electrostatic repulsion effect due to these like charges is effective over a distance of a few microns between particles. Particles smaller than about 0.2$\mu$ cannot retain any charge but remain apart by the electrical repulsion force field due to a double charged layer surrounding them which exerts strong repulsion between particles as they approach each other to within about 100 Å. These small particles remain permanently and uniformly suspended by Brownian Motion and repelled from each other by the electrical double layer and do not settle at any time, unless concentrated by centrifuge. These concentrated particles, although closer together, remain apart because of their electrical double layer repulsion fields.

The subresonant to near-resonant dipole particles not subjected to strong electric field, may form permanently stable dipole suspensions, since the gravitational settling force is more than overcome by the Brownian Motion forces. When dilute suspensions of these particles are subjected to an intense electric field, they may flock together and coagulate; however, concentrated suspensions are stable whether or not subjected to an intense electric field.

Conductive particles having a length L<2000 Å and width<85 Å have no equilibrium electric charge but if such dipole particles are subjected to an intense electric field, electrons may be emitted from the particles, which temporarily become positively charged. When the electric field is turned off, these positively charged particles strongly repel each other and are rapidly dispersed into random positions in space. The temporary positive charge is soon neutralized by the capture of electrons from the fluid. Even one electrical charge on such a particle produces such an intense electrical field, that electrical breakdown occurs in the suspending fluid medium near the particle and produces free electrons and ions in the fluid. The electrons may neutralize the positive charge on the particle and the positive ions remaining in the fluid may discharge to ground by contact with an electrode or eventually by a leakage path to ground. Thus, in equilibrium, all free charges may disappear from these particles and the fluid in which they are suspended. Other factors involved will be discussed.

In a strong electrical field, subresonant and near-resonant particles in a concentrated suspension form particle strings which, in turn, form an electroordered array. When the electric field is suddenly decreased to zero, the particles disperse, disorient and lose their acquired charge. As a result of this "electroordering effect", the electrodichroic ratio may be increased by more than an order of magnitude (by a factor of 10) and the rise and relaxation times may be decreased by several orders of magnitude (from 100 to 1000). In equilibrium (zero electric field) the particles are in random orientation and separated by mutual electrostatic repulsion due to their electric double layer and/or their electric charges. This electroordering effect results in the extraordinary properties herein described.

DETAILED DESCRIPTION OF THE PREFERRED EMBODIMENTS

These factors may be best understood by reference to the drawings, wherein in FIG. 1, there is shown a dilute suspension of particles in random orientation with no electric field applied thereto ($E=O$).

Figure 2:
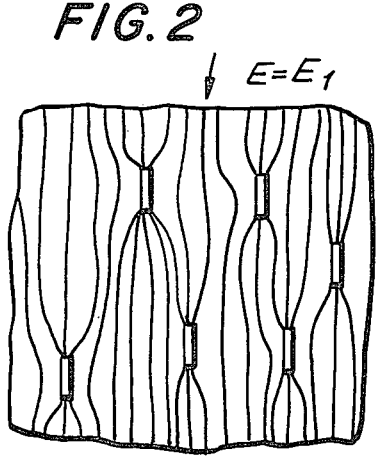
FIG. 2 illustrates the same particle suspension as in FIG. 1 but with the electric field applied and the particles aligned parallel to the field with little interaction between particles.

The same suspension is illustrated in FIG. 2 with the particles aligned in electric field $E=E_1$. The electric field lines only occasionally pass from one particle to another and the particles react independently with the electric field.

In dilute suspensions, particles are so far apart that particle strings and electroordered arrays require both a long time to form and a long time to disperse thus, rise and relax times are long. Very dilute suspensions may be stable with no electric field; however, in a strong non-uniform electric field, sometimes irreversible aggregates of particles are formed and the suspension is then said to be "coagulated".

Figure 3:
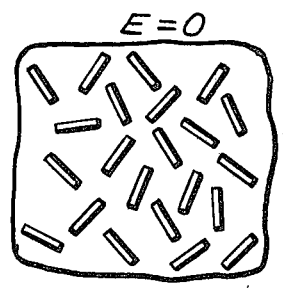
FIG. 3 illustrates a dipole rod particle "concentrated" suspension in which the particle number density per unit volume is large, the electric field is zero, and the particles have random orientation.

FIG. 3 illustrates a concentrated suspension with particles in random orientation and no electric field applied thereto ($E=O$). Because the repulsion force of electric fields surrounding the particles increases as particles approach, the particles cannot collide due to random Brownian Motion.

Figure 4:
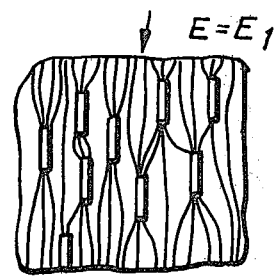
FIG. 4 illustrates the same particle suspension as in FIG. 3 but with the application of an electric field thereto with the particles aligned parallel to each other and in such proximity that there is great ineraction between the particles; the electric field being concentrated adjacent particles.

FIG. 4 depicts the same concentrated particle suspension as in FIG. 3 wherein the particles are subjected to an electric field $E=E_1$. The electric field lines from one particle frequently pass through an adjacent particle, resulting in an attraction between the particles and an additional aligning torque on each particle.

Figure 5:
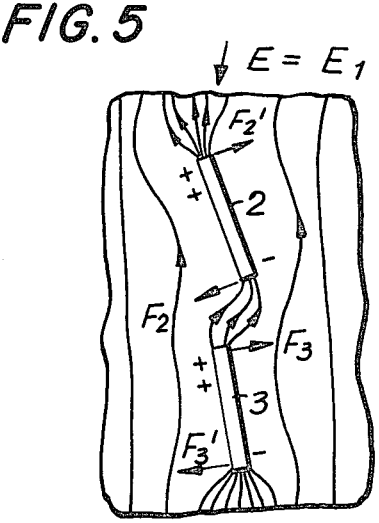
FIG. 5 depicts an enlarged view of FIG. 4, illustrating two particles having a net positive charge of one per particle immediately before maximum alignment and showing the electric field acting upon the induced charges between the proximate ends of adjacent particles and the torques tending to align the particles.

FIG. 5 depicts a magnified view of the concentrated particle suspension of FIG. 4 and shows an electric field between particles 2 and 3 which produces forces $F_2$ and $F_2'$ on particle 2, forces $F_3$ and $F_3'$ on particle 3 and an aligning torque on each particle.

Figure 6:
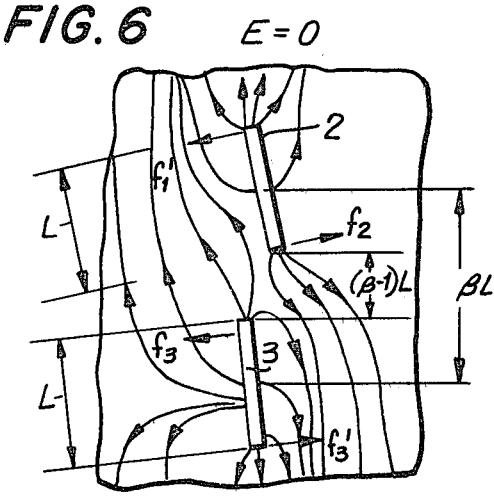
FIG. 6 is similar to FIG. 5 immediately after the electric field has been turned off and illustrates how the net charge per particle causes a repulsion between adjacent particles which forcibly disaligns and randomizes the particles.

FIG. 6 illustrates the same particles as in FIG. 5, just as the electric field has been turned off. In this case, the force vectors of particles 2 and 3 are reversed; now $f_2$ and $f_2'$ and $f_3$ and $f_3'$. The repulsion force vectors f are due to the like charges now existing on each particle and even though the particles are close together, the electric field lines from each particle proceed away from the particles toward a conductor (not shown). These field lines do not pass from one particle through the next. The repulsion forces $f_2$ and $f_3$ cause the particles to disorient and randomize.

Figure 7:
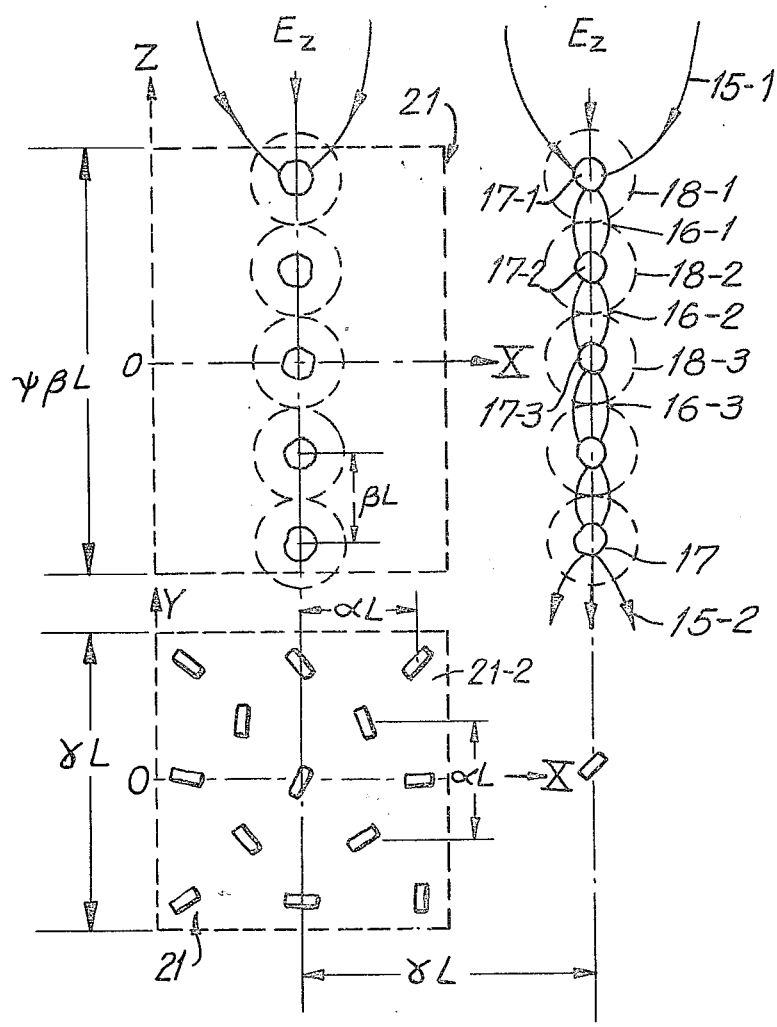
FIG. 7 depicts an electroordered dipolar array of particles in a concentrated suspension in an idealized section normal to the plane of the layer taken in the XZ plane below an idealized section taken parallel to the XY plane in the layer; wherein $\alpha L$ is the mean interparticle distance in the random state; $\beta L$ is the distance between particles in the particle string, and $\psi L$ is the mean distance between the particle strings which form an electroordered array.

FIG. 7 shows a particle string in an electroordered array. Upon the application of an electric field, the particles 17-1, 17-2, 17-3, etc. align with their longitudinal axes parallel to the electric field $E_z$ and move laterally parallel to the surface until they are substantially in line, forming a "particle string" 17.

The particle string comprises conductive particles 17-1, 17-2 . . . surrounded by short range repelling force fields, 18-1, 18-2 . . . and held together in alignment by the long range attractive force provided by the electric fields 16-1, 16-2 . . . which binds the particles together as though they were beads on a string. The volume of space, 21, between the particle strings 17 is substantially field-free. The repelling force field spheres 18-1, 18-2, etc., comprise electrical double layers due to molecules present in the fluid which are attracted to the conductive particles 17-1, 17-2, etc., respectively; and/or repelling fields due to like electric charges on the particles.

As the electric field intensity $E_z$ increases, there is increased attraction between the particles along the string, due to an increase in the strengths of the electric fields 16-1, 16-2, 16-3, etc., between them which counteract the repelling force fields 18-1, 18-2, 18-3, etc. As a result, the distance $\beta L$ between particles is decreased as $E_z$ is increased. The particles do not touch each other because the electric repulsion force greatly increases as particles move closer together. Thus, in weak electric fields, the particles are further apart and vice versa.

In a zero electric field, the random mean distance between particles is $\alpha L$. After an electric field has been applied, the particles form an electroordered array in which the distance between particles in the string is $\beta L$; the distance between particle strings is $\gamma L$ and the length of the particle strings having $\psi$ particles is $\psi \beta L$. In the limit, the Maximum Concentration $\overline{C}$ is approached as $\alpha = \beta = \gamma \rightarrow 1$; and the particles are so crowded together that the Electroordering Effect cannot occur.

As the particle concentration increases toward the Maximum Concentration $\overline{C}$, the Electrodichroic Ratio decreases and particle shorting may occur. A short from electrode to electrode is avoided by providing at least one insulating transparent layer over an electrode.

FIG. 8 is a log-log graph of a mathematical physics analysis hereinafter presented which provides a graph of $\alpha$ versus Concentration C, passing through a point at the Maximum Concentration $\overline{C}$.

FIG. 9 shows a section of an electrooptical variable light transmission panel in which the electroordering effect occurs; in which glass sheets 10 and 11 have transparent conductive coatings 12 and 13 on their inner surfaces. Insulating coatings 14 and 15 are deposited on the conductive layers. An insulating fluid 16 has a concentrated suspension of conductive particles 17-1, 17-2, 17-3 . . . , which form the particle strings 17 in a strong electric field. Other particle strings are shown parallel to the particle string 17 forming an Electroordered Array. The electric field lines 19 are normal to the surface of the glass sheets 10 and 11 and nearly parallel to the light path direction 20. The length of the particle string and number $\psi$ of particles in the string is limited by the layer thickness d, which may be only a few microns. The Maximum Electrodichroic Ratio is $\overline{Q}_{rz}$, which is a function of $\psi$, is thus also limited by the layer thickness d.

This is experimentally confirmed by the data plotted on FIG. 18, a linear-linear graph of Maximum Electrodichroic Ratio $\overline{Q}_{rz}$ as a function of layer thickness d in microns. The plot of $\overline{Q}_{rz}-1$ is linear with the layer thickness d up to approximately $\overline{Q}_{rz} \approx 16$.

In proximity, asymmetric conductive particles exhibit properties in an electric field differing by one or more magnitudes compared to the same particles far apart and independent of each other. In an intense electric field, conducting particles suspended in an insulating fluid become induced dipoles; and when in proximity, the ends of particles closest together attract each other causing an increased intensity of the electric field between particles. Strong electrical forces cause the particles to move into particle strings along electric field lines, as shown in FIGS. 7 and 9. Particle string formation increases the transparency in the open state and increases the Electrodichroic Ratio. In effect, particles along the string "hide in the shadow of the first particle facing the light.

Figure 10:
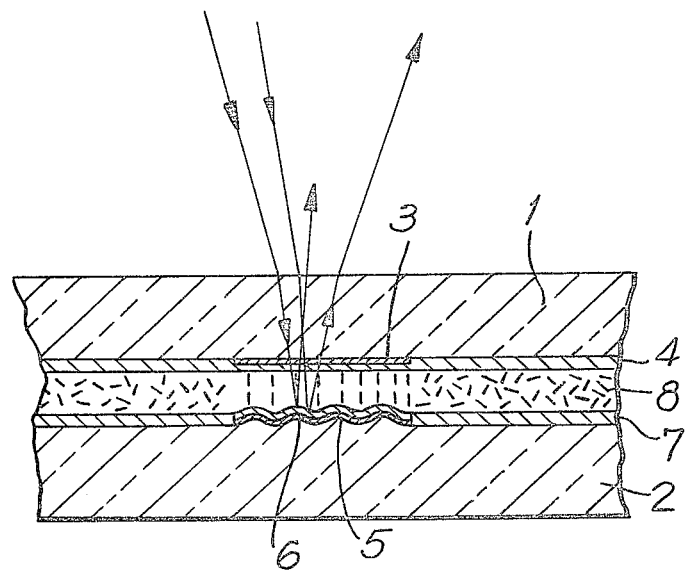
FIG. 10 illustrates a section of an electrooptical reflective display containing electrooptical fluid capable of forming an Electroordered Array.

In FIG. 10, there is shown a cross section of an electrooptical cell suitable for a reflective display utilizing a dipolar suspension formulated pursuant to a preferred embodiment of this invention and which produces an image having high contrast and excellent visibility in ambient light. This display is also useful in electronic watches, computer readouts and flat TV and other displays.

The supporting sheets 1 and 2 are fabricated of glass or other suitable material. The upper sheet 1 has a thin transparent conductive coating 3 on the inner face. The transparent conductive coating 3 may comprise stannic oxide, or indium oxide having dopants known in the art which provide a transparency preferably exceeding 85%. A thin transparent insulating coating 4 may be placed over the transparent conductor 3 forming a symbol in a display. The coating 4 continues onto the adjacent uncoated glass surface.

On the upper surface 5 of the lower glass sheet 2, a satin finish undulation is produced. The brightness effect can be enhanced by limiting the reflected light to a reflection pattern determined by the surface undulation of the reflective coating 6 as a function of the amplitude and the wavelength of the undulation; for example, the undulations produced should have an amplitude of between 0.2 and $2\mu$ and length periods within the same range. Where there is forward scattering from the Electroordered Array, or where a specular reflection from the reflector is not objectionable, the undulation may be replaced with a plane surface. To obtain a high reflectivity surface which is visible from all angles, the surface should be a "satin finish". Such a surface may be produced by grinding with fine abrasives, or by bombarding the surface with fine abrasives propelled by an air jet. Another method of producing a fine satin finish is to utilize a hydrofluoric acid etch, well known in the art. Over the undulation, there is evaporated or otherwise coated the reflective layer 6 of aluminum, silver or chromium; but preferably aluminum for its inertness, which has a thickness of about 75 to 300 Å and a reflectivity of the order of 90 to 95%. Over the aluminum layer 6 there is placed another transparent insulating layer 7. The electrooptic fluid is placed in the space 8 between the insulating layers 4 and 7 which have a thickness of 0.2 to $2\mu$.

In a display where symbols are deposited as shaped electrodes, the electric field concentrates at the edges of the electrodes and this causes the migration of dipole particles to the vicinity of the edge by the electrophoretic effect which may cause local coagulation or deterioration of the dipole fluid. This problem is avoided or eliminated by the use of transparent insulating films over the conductor which prevent the dipole particles from reaching the more concentrated field existing near the edges of the display characters. The transparent insulating layers 4 and 7 may comprise magnesium fluoride, silicon monoxide, tantalum oxide, titanium dioxide, or the like.

It is preferred that the material forming the layer 7 have a large dielectric constant $k_e$. The results in a smaller voltage drop across the layer 7 since the voltage drop across the layer varies as $1/k_e$. Titanium dioxide $TiO_2$ has an index of refraction $n \approx 2.8$ and a dielectric constant $k_e \approx n^2 = 7.8$. An insulating transparent layer of this material of $0.5\mu$ thickness has excellent insulating properties, no pinholes and the advantage of a small voltage drop. The large reflectivity of this film, due to its large index of refraction, is not disadvantageous when placed on a reflecting surface 6, such as aluminum.

The diffuse reflection layers 7 and 8 shown in FIG. 10 may alternatively comprise a plane mirror surface 7 over which is placed a diffuse coating 8 comprising transparent high index particles suspended in a layer having a lower index of refraction, for example, a suspension of $TiO_2$, $PbCO_3$, or other high index particles suspended in a low index glass or plastic layer insoluble in the dipole suspension fluid.

In a package display utilizing a variable transmission dipole fluid operating by the Electroordering Effect, the first surface glare may be eliminated by a non-reflective coating, for example; of the multilayer type, or preferably a coating of the type described in my U.S. Pat. No. 3,679,451, known by the trademark "NOGLA".

In an electronic watch display to provide a 1-year operating life with a small battery, it is required that the total power loss be less than 1 $\mu$w/cm$^2$; the dipole suspension have a resistivity $\geq 10^{10}$ ohm-cm., and the operating voltage be 1.5 volts peak-to-peak at 64 Hz.

In the U.S. Pat. No. 3,512,869, entitled "Dipolar Electro-Optic Structures", it was shown that the dipole suspension layer should have resistivity in excess of $3 \times 10^7$ ohm-cm; and in U.S. Pat. No. 3,625,869, entitled "Method of Increasing the Resistivity of a Dipole Suspension", it was shown that the evaporation of a lower boiling point conductive fluid from the high resistivity suspending fluid will increase the resistivity of the dipole suspension fluid.

With a concentrated suspension of submicron particles having a resistivity in excess of $10^8$ ohm-cm. and preferably $10^{11}$ ohm-cm. or more, particle strings are formed in near breakdown electric fields and the herein described improved electrooptical properties are produced.

A new and improved method of increasing the resistivity of a dipole suspension follows:

A dilute particle suspension is centrifuged at rpm-1; the top fluid suspension from rpm-1 is then centrifuged again at a somewhat greater speed, rpm-2. Particles which are sedimented at rpm-2 form a concentrated dark "oil" or "mud" at the bottom of the centrifuge container which contains particles from the "slot" between rpm-2 and rpm-1. After decanting the top fluid, the sediment comprises a concentrated suspension which is a dark fluid capable of forming an Electroordered Array in an electric field. The particles employed may be rods or discs, comprising any metal such as aluminum, chromium, etc.; a semi-metal such as graphite flake crystals; a semi-conductive asymmetric crystal compound such as molybdenum disulfide; or, a dichroic blade shaped crystal such as Herapathite. At greater than 5000 g's, a substantial fraction of the particles are submicron and have a size less than 3000 Å. The size depends upon particle density, size and shape, centrifugal g; time; fluid density and viscosity.

Graphite is highly dispersed in perchloroethylene and forms an exceptionally stable suspension. With submicron particles of graphite $\delta_p = 2.25$ gms/cm$^3$ suspended in perchloroethylene $\delta_f = 1.60$ gms/cm$^3$, and $(\delta_p - \delta_f) = 0.65$ gms/cm$^3$, sedimentation occurs slowly at about 13,000 g's. With an aliphatic suspending fluid for graphite particles, such as n-Decane $\delta_f = 0.73$ gms/cm$^3$ and $(\delta_p - \delta_f) = 1.52$ gms/cm$^3$; the sedimentation force is increased by a factor of 2.3 and sedimentation occurs rapidly and almost completely at about 6,000 g's.

To increase the resistivity of the concentrated suspension, it is diluted by a factor of 100 to 1000 with a fluid which has a resistivity of at least $10^{12}$ ohm-cm. Traces of any conductive fluid such as water, alcohol, etc., will remain in the suspending fluid after centrifuging and necessitates sedimenting the particles again. The resistivity of the sediment increases each time by about an order of magnitude until it approximates that of the high resistivity fluid. For example, starting with a concentrated particle suspension having resistivity of about $10^7$ ohm-cm. and repeating this process about 5 times with a fluid having a resistivity $> 10^{12}$ ohm-cm., a concentrated particle suspension having a resistivity of about $10^{12}$ ohm-cm. is obtained.

Aluminum vapor coated on a polystyrene sheet of 30% transparency formed aluminum particles having a thickness of about 80 Å. Various size ranges may be prepared by dissolving the sheet in a solvent, and breaking up these particles by fluid shear forces in a "homogenizer" and separating them into rpm slots as above described. Various shapes of particles may be obtained depending on the vapor deposition conditions. The vapor coating appears to be crystalline as it often breaks into elongated blades with well defined angular ends. Under other conditions of vapor deposition, submicron discs may be obtained.

These particles may be suspended in an ester fluid such as isobutyl acetate, with a trace of nitrocellulose. When a D.C. field is applied to this suspension between bare electrodes, the particles migrate toward and coat the positive electrode, showing that the particles are negatively charged. When other esters such as pentyl acetate or octyl acetate are used, the charge on the particles becomes less negative or neutral. When the proportion of nitrocellulose is increased to about 1% the particle migration ceases and particles do not coat the electrodes, suggesting that the net particle charge is zero.

Figure 12:
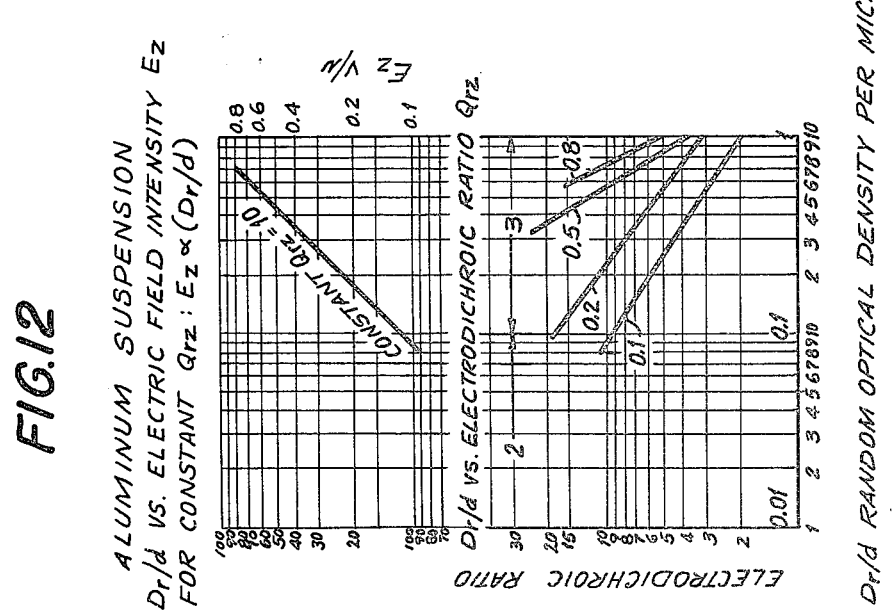

FIG. 12 shows a plot of data for a multiresonant aluminum dipole suspension on a log-log graph of $(D_r/d)$ versus $Q_{rz}$ and $E_z$. The relax time is not shown as it is very long; that is, the suspension is remanent. The aluminum particles are suspended in a fluid comprising equal parts of isopentyl isobutyrate and 1-iodobutane, with a trace of nitrocellulose $<0.1\%$.

The remanence or long relax time is further increased by the use of polystyrene as the polymer instead of nitrocellulose.

The remanence of these particles appears to be due to different numbers of multiple charges which are retained on particles. As the particles are aligned, the particle charges are displaced to balance the field between adjacent particles of unequal charge. Permanent electric dipoles are thus formed on the aligned particles, which may remain permanently aligned in the fluid until randomized by an external force, or more slowly by electrical leakage and Brownian motion.

This aluminum dipole suspension operates in the transmission mode at about 5 volts peak-to-peak sine or square wave at 30 to $10^4$ Hz across a 12 micron layer; that is, with an electric field intensity of only 0.42 volts per micron to produce an electrodichroic ratio of 10; or 8 volts at 0.67 volts per micron to produce an electrodichroic ratio of 15. This behavior is best explained by the "Electroordering Effect". When the aluminum particles are far apart, there is little interaction between them, but as a particle suspension becomes more concentrated, particle interaction begins and electroordering of the particles occurs.

A concentrated near-resonant to multiresonant aluminum suspension has a diffuse silvery reflectance in the random state, and is black when the particles are partially aligned; for example, with about 1.5 volts peak-to-peak A.C. applied across a 12 micron layer in which $D_r/d$ exceeds 0.2. These unsuspected results are important for low power displays, since the reactive and the resistive powers are each proportional to $V^2$. Compared to the power used by electrooptical fluid devices, taken as 100%, operating at 30 volts peak-to-peak; the power used by this suspension in the reflective/black mode, is only $2\frac{1}{2}\%$. A further advantage is that the low voltage simplifies the electronic circuits.

As computed in Example No. 13, the total power consumption is less than 1 $\mu$w/cm$^2$. Since the rise time is about $10^{-1}$ seconds, the total average power used for remanent alignment once after each 1 erasure per minute is about $10^{-9}$ watts/cm$^2$. Since the random state is diffuse reflective and the "on" state is black, the display numerals appear as black on a diffuse silvery background. Such remanent suspensions are of particular interest for use in small battery operated display devices such as wrist watches which must operate over long periods of time without requiring a battery refill. By comparison, a dilute suspension where $D_r/d << <0.2$ appears dark by reflection in the random state. In a dilute suspension, the reflective particles are so far apart that the light enters some depth into the suspension layer before it is randomly reflected by the particles; and such light may be internally reflected several times by other particles and so become lost or absorbed within the layer. However, in a concentrated suspension, the light enters a short distance into the layer, encounters a particle, and is reflected back out of the layer, usually without encountering another particle. The concentration is limited with large particles. For best operating characteristics with a concentrated suspension of multiresonant reflective remanent particles there is an optimum concentration range of about 0.2 to 0.4 Optical Density/$\mu$.

For a metal dipole suspension in a suspending fluid having an index of refraction of about 1.5, the reflected or scattered component rapidly decreases for particle diameters less than $\lambda/3 = 1880$ Å. Below $\lambda/6 = 1000$ Å there is very little reflectivity, and at $\lambda/10 = 500$ Å, the reflectivity is substantially zero.

The absorptivity for transmitted light increases to $\lambda/4 = 1500$ Å, and then decreases almost linearly down to zero dimension. At $\lambda/10$, the absorptivity has decreased only about ⅓ from peak, while the reflectivity is substantially zero. Thus, as the particle diameter decreases from 2000 Å down to 500 Å there is a rapid change from diffuse reflective to black.

This aluminum dipole suspension is representative of a class of remanent suspensions; that is having a rapid rise time of the order of one hundred milliseconds upon the application of the voltages noted, and a very slow relax time of the order of 1 to $10^4$ seconds. Such suspensions may comprise various metals such as aluminum, silver, chromium, etc., having a thickness of 50 to 150 Å and a diameter in the near-resonant to multiresonant range. The smaller particles relax more rapidly, the larger particles more slowly.

Such remanent suspensions are useful for memory type displays, wherein information is written into the display, and is retained by the display for a predetermined time, unless erased as required in a time less than the relax time. Such an erasure may be accomplished electrically in which the particles are disaligned and randomized by a suitable electrode structure for switching the aligning field from a Z to X or Y direction; that is from normal to parallel to the plane of the display, as described in my U.S. Pat. No. 3,527,525. Such erasure may alternatively be accomplished for the entire display by a shear force introduced into the liquid to rapidly disalign and randomize the aligned dipoles; for example as shown in my U.S. Pat. No. 3,257,903 wherein the mulfacing plates between which the dipole suspension is placed are displaced slightly relative to one another. Alternatively, the plates may be stationary and a shear force introduced into the fluid between the plates by causing the fluid to move or oscillate parallel to the surface of the display. Many methods may be employed to introduce a motion into the liquid. For example, the liquid motion may be actuated by a piezoelectric crystal in contact with it; or a flexible membrane to which a pressure can be externally applied. Another method to cause fluid motion by an electrocapillary junction.

The same aluminum particles which are remanent, that is with $\tau_r >> 1$ second, show a ralax time which is rapid, that is $\tau_r << 1$ second, for example 100 milliseconds by a change in chemical environment. The rapid relax time is produced by controlling the electric charge on the particles from strongly positive for remanent suspensions to slightly negative for suspensions which relax most rapidly. These conditions are peculiar to multiresonant particles where m is $>> 1$. When $m << 1$, the particles retain zero or a few charges and do not exhibit remanence, and the relax time is very rapid, that is $<100$ ms.

A suspension of multiresonant aluminum particles was suspended in various proportions 0 to 100% of isopentyl isobutyrate and 100% to 0% of pentyl acetate containing about 0.1% nitrocellulose. The fluid components were varied for values of $D_r/d = 0.2$ and 0.4, respectively. The relax time of the suspension and the charge on the particles were measured as the percentage of isopentyl isobutyrate was increased from 0 to 100%. For an isopentyl isobutyrate/pentyl acetate ratio (IPB/PA) 100/0, the relaxation time was 300 ms and the charge was strongly negative. As the IPB/PA ratio decreased to 50/50, the charge became less negative and the relaxation time decreased to a minimum of 150 ms. At decreased ratios of IPB/PA from 50/50 to 0/100, the charge approached zero, and the relaxation time increased again to 300 ms.

Corresponding figures for $D_r/d = 0.2$ were lower starting at 250 ms for 100/0 decreasing to 100 ms at 50/50 and increasing again to about 250 ms at 0/100.

With these multiresonant aluminum suspensions, the optimum $D_r/d$ is about 0.2; at greater concentrations, for example, 0.4, the relax time increases, since the particles become so close as to impede each others motion. At lower concentrations, for example for $(D_r/d) < 0.1$ the suspension may coagulate. The relaxation time is increased with particles having an increased negative charge. The minimum relaxation time occurs when the particles are slightly negative.

With certain fluid esters, such as isobutyl acetate or isopentyl isobutyrate containing a proportion of nitrocellulose the charge on suspended aluminum particles is negative; but, with higher normal esters such as pentyl acetate or octyl acetate, the charge on the particles is neutral.

The charge on the conductive particles is influenced by the chemical structures of the polymer and the fluid. For aluminum particles in perchloroethylene with $\sim 1\%$ polystyrene the particles are strongly positive and the suspension is remanent, with a relaxation time of $> 10^2$ seconds. The same particles in an ester/perchloroethylene 70/30 solvent with $\sim 1\%$ nitrocellulose are negative and the relax time may be only $10^{-1}$ seconds.

Thus, by a choice of the chemical environment of the suspending fluid and the dissolved polymer, a multiresonant conductive particle suspension may have a rapid relaxation time, or a very slow relaxation time. The resistivity of these suspensions exceeded $10^{12}$ ohm-cm and does not appear to be a factor in the charge on the particles.

The charge on the particles may be either negative, zero, or positive.

When the particle charge is zero, the particles may be said to be at their isoelectric point, a phenomenon which has been noted with particles such as proteins or pigment particles suspended in aqueous fluids wherein $\rho < 10^{-1}$ ohm-cm and whose pH varies.

In water, aluminum oxide particles have a positive charge in acid solution and negative charge in alkaline solution above pH 9; the isoelectric point. A similar ioselectric point appears to occur in insulating fluids, where the concept of pH may not be applicable. There may be a thin monomolecular oxide film on the aluminum particles.

However, for insulating fluids in which the resistivity is about $10^{12}$ ohm-cm, the criteria applied to aqueous solutions are not applicable, yet an isoelectric point is found, influenced by the chemical structure of the fluids.

In conductive particle suspensions in insulating fluids of certain composition there is an isoelectric point where the particles have no charge.

A multiresonant aluminum particle suspension in an ester such as pentyl acetate, has a positive charge and deposits quickly onto a glass surface. From 0.05 to 5% of a polymer such as nitrocellulose retards or eliminates this deposition. Aluminum in isobutyl acetate, or isopentyl isobutyrate and nitrocellulose $\sim 1\%$ with about 3% of a plasticizer (such as 3% Flexol 13-13, manufactured by Union Carbide Co.) is negatively charged and does not deposit onto glass. Aluminum, with a positive charge in perchloroethylene and polystyrene 0.1%, deposits quickly onto glass. Increasing the polystyrene to about 3% prevents or slows down the deposit. The presence of a 1-halogen alkyl where the alkyl has 6 to 12 carbon atoms, and the halogen is chlorine, bromine or iodine produces an excellent aluminum suspension. The aluminum has a positive charge, and is surrounded by the 1-halogen alkyl fluid as a "double charge layer". The halogen alkyls are examples of electron-acceptor molecules, which attract an electron from the conductive particles.

Conductive particles having positive charges may deposit onto glass or transparent conductive oxide surfaces which have a negative charge. Conductive particles such as graphite or a metal such as aluminum may be given a negative charge as above described, by a suitable polymer or fluid, and will then not deposit onto these negatively charged surfaces.

For a very rapid relaxation time, $\tau_r << 100$ ms the dipole particle size must be in the near-resonant to sub-resonant region. These suspensions are black in the random state and transparent when aligned. For example, a subresonant to near-resonant suspension of aluminum, chromium, etc., has a rapid relaxation time of the order of 1 to $10^2$ ms, depending on size, shape and charge of the particle, and the viscosity and composition of the suspending fluid.

Figure 13:
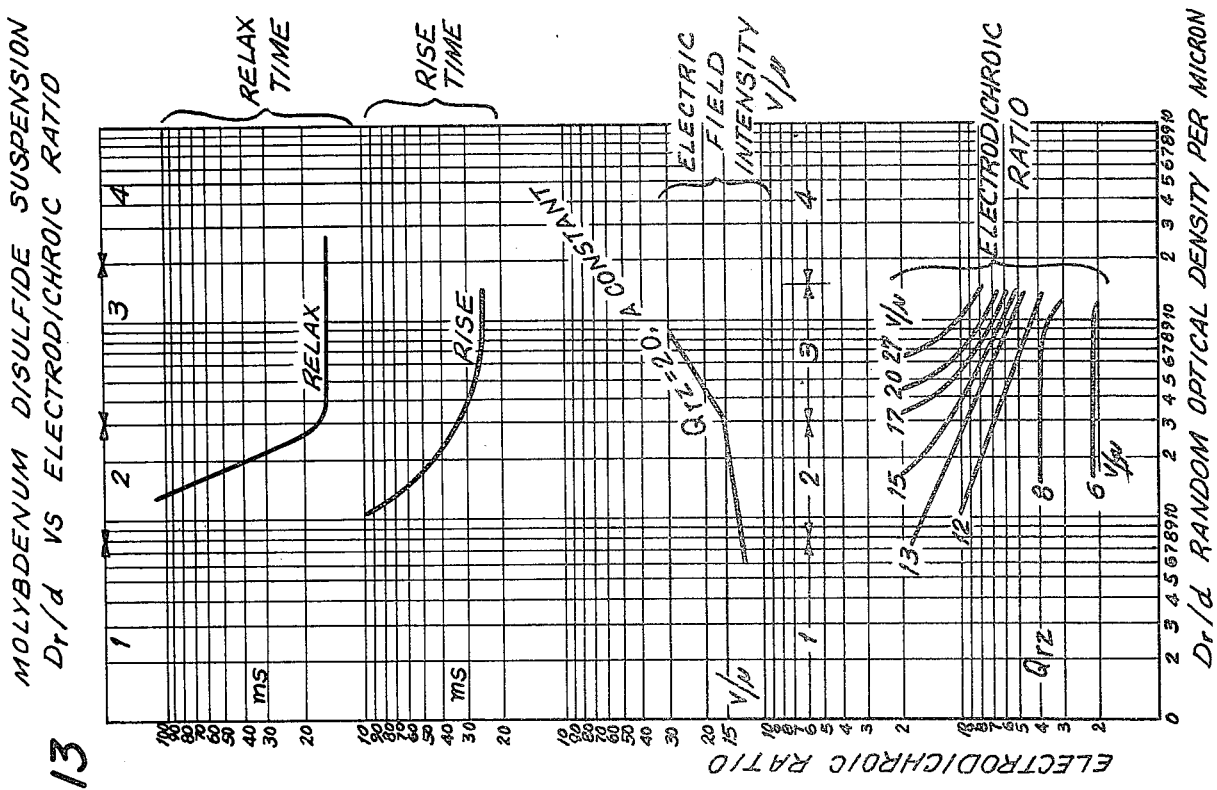

FIG. 13 shows a log-log graph of Optical Density/$\mu$ versus Electrodichroic Ratio, Rise and Relax time for molybdenum disulfide crystal plates, which exhibit the electroordering effect, but in which the particles are not positively charged by the emission of electrons. This is shown by the Rise and Relaxation times following approximately the same curves and being approximately the same order of magnitude.

Graphite is amphoteric; that is, it may be charged either positively or negatively. Graphite particles suspend in an electron-acceptor fluid, such as perchloroethylene, in which they have a positive charge. When an electric field of sufficient intensity is applied, electrons are emitted from the graphite particles and captured by the fluid; and the graphite particles may temporarily become more positively charged. The graphite particles are repelled from each other by their strong positive charge.

Its properties make perchloroethylene particularly suitable as a suspending fluid for graphite, since it has:
(1) An electron-acceptor capability
(2) A large resistivity $\rho > 10^{12}$ ohm-cm.; which decreases resistive power loss
(3) A small dielectric constant $k_e = 2.30$; which increases the electrical force on a conductive particle
(4) A small viscosity of 0.88 cp.; which decreases rise and relax times
(5) A large density of 1.63 gms/cm$^3$; which increases the buoyancy of suspended particles.

Dipole particles suspended in an insulating fluid in a layer between electrodes in a cell, and subjected to a strong electric field may coagulate and/or deposit onto an exposed electrode surface or an insulating surface such as glass. A small fraction of surfactant and/or polymer in the fluid may avoid these diffculties.

With perchloroethylene as major proportion of the suspending fluid, graphite particles remain in suspension; glass insulating surfaces or electrode surfaces are not wetted; the particles do not deposit onto surfaces; and the particles do not coagulate when the suspension is subjected to a strong electric field. A mixture of a proportion of other compatible fluids having a greater boiling point and a lower freezing point is to extend the lower operational temperature, preferably less than $-40°$ C.

Preferred additive fluids have these properties:
a boiling point greater than 180° C.
a pour point less than $-40°$ C.
a viscosity less than 50 cp.
a resistivity greater than $10^{12}$ ohm-cm.
compatibility
effective dispersant action Examples of these fluids are higher esters such as n-pentyl acetate, n-octyl acetate, isopentyl isobutyrate, and a class of fluids known as "plasticizers", for example, Di-2-Ethyl Hexyl Adipate, and n-Octyl n-Decyl Phthalate, which are listed in Table III, polymethylsiloxane, (Dow Corning 200 1–10 cp.) and other silicone derivatives such as Silicone S20, manufacture by Union Carbide Corporation.

An example of a preferred fluid and a range useful for suspending and dispersing graphite flakes is:

| Material | Formula No. 1 % | Range % |
|---|---|---|
| Perchloroethylene | 95 | 99–85 |
| n-Octyl n-Decyl Phthalate (NODP) | 5 | 1–15 |
| Silicone S20 | 5 | 1–10 |
| | 100 | 100 |

Fluid Formula No. 1 does not completely evaporate under atmospheric conditions; so that particles are not deposited onto surfaces, and the particle dispersion is maintained.

Figure 14:
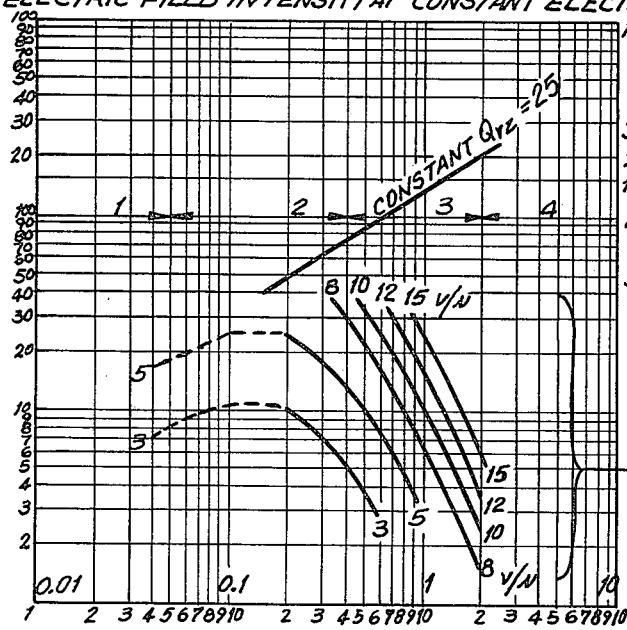

FIG. 14 shows for a graphite flake suspension in Fluid Formula No. 1 a log-log graphy of Concentration or Optical Density/$\mu$, versus particle string Electrodichroic Ratio $Q_{rz}$ at various constant electric field intensities $E_z = 3, 5, 8, 10, 12, 15$ volts/$\mu$, also $E_z$ versus $D_r/d$ is shown for constant $Q_{rz} = 25$. Electron microscope pictures of these graphite particles show thin flakes of irregular outline, frequently elongated rectangles or trapezoids; with 1000 Å $\leq$ L $>$ 3000 Å; and a $\approx$ 2500 Å. The graphite-crystal flakes used were subresonant and near-resonant conductive asymmetric particles.

Tests were made by transmission through a cell having an electrooptic fluid layer of thickness d. Each transparent conductive film was coated with MgF$_2$ insulating layers, about 1$\mu$ thick. No correction was made for total voltage across the dipole layer, since the voltage drop across the insulating films was relatively small. The data obtained was the minimum Optical Density at the applied voltage, the (closed) random Optical Density/$\mu$ unit thickness of dipole layer $D_r/d$, the particle string Electrodichroic Ratio $Q_{rz}$, the Rise Time $\tau$, and the Relax Time $\tau_r$. The relationship between $D_r/d$ and the particle concentration in the fluid, C is given in Equation (9).

Figure 15:
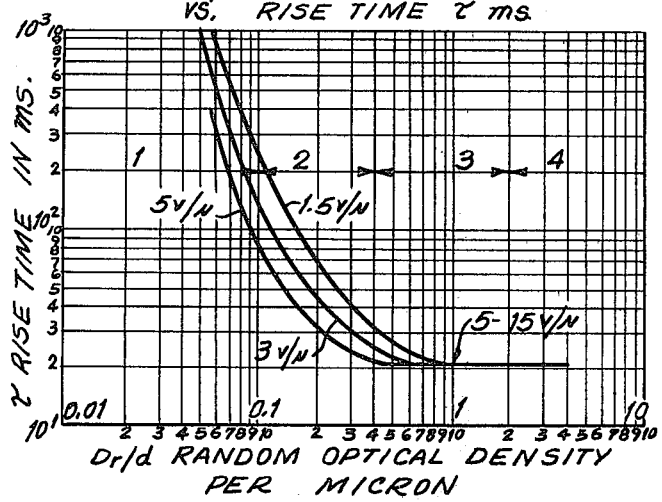
FIG. 15 is plotted for the same data and on the same graph as FIG. 14, except that it shows a family of curves for Rise Time vs. $(D_r/d)$ at various constant Electric Field Intensities.
Figure 16:
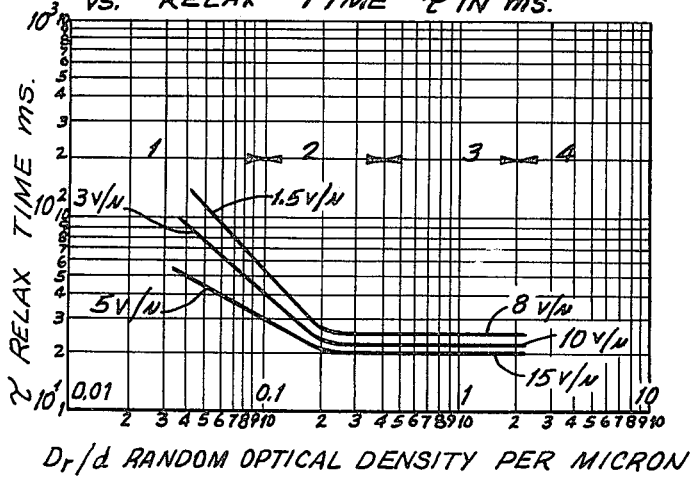
FIG. 16 is similar to FIG. 15, except that the Relax Time is illustrated, instead of the Rise Time.

FIGS. 15 and 16 are the same data as FIG. 14, except that there is shown $D_r/d$ versus Rise Time and Relax Time, respectively, for the same various Electric Field Intensities. FIG. 17 is for the same data as FIG. 14 and shows on a linear-linear graph Electrodichroic Ratio versus Electric Field Intensity at various constant values of $D_r/d$. FIGS. 14–16, inclusive, show for the particular graphite submicron particles used that there is a preferred optimum range of particle concentration of about 1% to 20% in the suspending fluid within which the extraordinary properties of the Electroordering Effect become manifest: as the particle concentration increases from about 1% to 4%, the Relax Time and Rise Time decrease by two orders of magnitude. As the particle concentration increases and exceeds about 20%, the particles may bridge and short from electrode to electrode. In this example, in an Optimum Concentration range from about 2 to 7%, the electric field intensity $E_z$, to reach the maximum Electrodichroic Ratio of 20 to 40, increases from about 4 volts/$\mu$ at 1% Concentration to about 12 volts/$\mu$ at 7% Concentration.

Concentrated submicron conductive dipolar suspensions of graphite crystal flakes in the Fluid Formula No. 1 have the extraordinary properties shown in FIGS. 14 to 18 and are summarized:

TABLE NO. I
PROPERTIES AND APPLICATION DATA FOR VARAD ® ELECTROOPTICAL FLUID SERIES V-200

1. Material - subresonant to near-resonant graphite flake dipoles suspended in perchloroethylene fluid Formula No. 1. The fluid suspension is non-reactive, reactive, non-inflammable, and stable.
2. Index of Refraction of Fluid: $n_D \approx 1.50$
3. Electrodichroic Ratio: maximum about 40
4. Closed Optical Density per unit thickness: specified per micron
5. Electric Field Intensity: A maximum electrodichroic ratio of about 40 is obtained in the range of random (closed) Optical Density/$\mu$ of 0.1 to 1.0 with an electric field intensity of 3 to 15 v/$\mu$.
6. Resistivity $\approx 10^{12}$ ohm-cm.
7. Resistive power $\approx 1$ $\mu$w/cm$^2$
8. Frequency: 50 Hz to 10 kHz
9. Wave Form: Square 50 to 200 Hz, Square or Sine > 200 Hz, no D.C.
10. Rise Time - Voltage Applied: about 20 milliseconds
11. Relax Time - Voltage Off: about 30 milliseconds
12. Operating Temperature: −20° C. to +100° C.
13. Life: No deterioration is expected
14. Transmissive Cell Construction: Glass with high transmission 85% + transparent conductive films on inner faces. At least one of the transparent conductors must have a transparent insulating layer on it about 1 micron thick; such as MgF$_2$ or Al$_2$O$_3$. The insulating layer must be pin-hole free.
15. Reflective Cell Constrution: Same as 14, except rear layer comprises high-reflectivity aluminum.
16. Example of Operating Conditions using VARAD ® V-200/0.5:
    Optical Density per micron = 0.5
    Electrical Field to full open = 10 volts/$\mu$ peak-to-peak
    Frequency = 64 Hz square wave with no D.C. component

| Operating Mode | Layer Thickness Microns | Closed O.D. | % | Open O.D. | % R,T | Total Volts peak-to-peak |
|---|---|---|---|---|---|---|
| Reflective | 3 | 3.0 | 0.1 | 0.10 | 80 | 30 |
| Transmissive | 6 | 3.0 | 0.1 | 0.10 | 80 | 60 |

From the data for graphite suspensions graphed in FIGS. 14–18, inclusive, and from similar data obtained for other conductive particle suspensions, general laws have been established, which distinguish 4 regions, each region being defined by ranges of concentration or ($D_r/d$) characterized by very different properties:

Region 1—Dilute Concentration

In this region ($D_r/d$) varies up to 0.10 Random Optical Density/$\mu$, and the concentration is said to be "dilute". These suspensions may be stable in a zero electric field, but when a strong electric field is applied, the particles often irreversibly coagulate. Remanent charges on the particles produce an electrical attraction force between particles which cause aggregates to form. Since coagulation is a function of electrical field intensity and time, the electrodichroic ratio, rise and relax time measured are erratic. In general, particle suspensions in this region are not useful in low viscosity fluids. With suspending fluids of greater viscosity and with added surfactants and polymers these dilute suspensions may be stabilized; however, such suspensions have a slow response.

Region 2—Medium Concentration

Medium Concentration Region 2 may also be termed the "transition" region because the electrooptical properties and stability rapidly change with $D_r/d$. In the particular graphite suspension for which the data is shown in FIGS. 14–18, inclusive, the medium concentration range is from $D_r/d=0.10$ to 0.40 Random Optical Density/$\mu$. In this range, the rise time and relax as shown in FIGS. 15 and 16, rapidly decrease by about 2 orders of magnitude. As $D_r/d$ increases, the Electroordered Arrays are more readily formed in a stable configuration.

The more concentrated portion of this region may be useful for many applications, since electrodichroic ratios to 40 may be achieved with an electric field intensity of about 8 v/$\mu$. For example, for d = 12 to 25$\mu$ with a Random Optical Density of 4, $D_r/d=0.16$ to 0.35. An electrodichroic Ratio of 40 is obtained with about 10 v/$\mu$. This is a change from substantially opaque $D_r=4$, $T_r=0.01\%$, to substantially transparent $D_z=0.1$, $T_z=80\%$; or a Transmission Ratio of $(T_z/T_r)=8000$.

Region 3—High Concentration

In this region of high concentration, where $D_r/d$ varies from about 0.4 to 1.3 Optical Density/$\mu$, the Electroordered Array is most readily formed and dispersed, the electrooptical properties are high, the suspension is permanentl stable, and reversible over a substantially infinite number of cycles. For this particular graphite suspension, the rise and relax times in this region are approximately constant. The rise time decreases from about 40 ms to 15 as the electric field intensity is increased from 2 to 10 v/$\mu$. At a given electric field intensity, the rise time is almost constant over this range. In a similar manner, the relax time decreases from about 40 to 17 ms, as the electric field intensity is decreased from 10 to 2 v/$\mu$. However, as $D_r/d$ increases from 0.5 to 1.3, the relaxation time becomes substantially constant at about 18 ms, independent of the previously applied electric field intensity.

Region 4—Extreme Concentration

In this region, where $(D_4/d) \geq 1.3$, the concentration is so great that the particles are too crowded to permit a well formed Electroordered Array to occur, and there are many particles between Electroorderd Arrays. In this region, an increased concentration is characterized by a decrease in the Electrodichroic Ratio at constant electric field intensity, electrical shorting across the layer may occur and stable operation may not be attained.

OPTIMUM CONCENTRATION

The optimum operating region depends on the engineering objective: preferably however, chosen from regions 2 and 3 where the suspension is stable and reversible; avoiding region 1 which is unstable, and region 4 which is dysfunctional because of particle overcrowding and shorting. An exception occurs, if a more viscous fluid is employed to stabilize region 1, but then rise and relax times are slow. In Region 2 from $D_r/d = 0.10$ to 0.40, the $Q_{rz}$ is a maximum of 40 and $E_z$ varies from about 4 to 7.5 v/μ. For the smallest operating voltage and the fastest response, region 3 from $D_r/d = 0.4$ to about 1 may be employed.

The concentrations defining the regions 1, 2, 3, and 4 may vary, depending upon the particle size, distribution and shape; fluid composition and the nature of the particle; particle charging; and the electrical double layers. The thickness of the electrical double layer depends on the chemical composition of the particle and the fluid in which it is suspended.

With uniform particle dimensions, in certain cases, the Electroordered Arrays are so regularly spaced as to produce color diffraction effects when light is passed through the layer at an angle to the normal. First order diffraction colors are seen as this angle is varied. In certain suspensions, this occurs when the maximum electric field is applied of about 14 v/μ. In Example No. 10, it is shown how this effect may be utilized to compute the distance $\gamma L$ between the partice strings in the Electroordered Array.

TABLE II
VALUES OF PHYSICAL CONSTANTS SOLIDS

| Material | Density $\delta \times 10^3$ kg/m$^3$ | Dielectric Constant $k_e$ | *** k OD/μ-% | Resistivity $\rho$ ohm-cm. |
|---|---|---|---|---|
| Aluminum | 2.70 | ∞ | | $2.65 \times 10^{-6}$ |
| Chromium | 7.13 | ∞ | | $12.9 \times 10^{-6}$ |
| Carbon (Graphite) | 2.25 | ∞ | 0.100 | $1375 \times 10^{-6}$ |
| Molybdenum Disulfide | 4.8–5.0 | — | 0.080 | $\sim 10^{2\ to\ 6}$ * |
| Herapathite | 1.7 | 9.** | 1.58 | — |

*Variable Resistivity depending on processing - Estimated from "The Electrical Conductivity of Molybdenite", A. T. Waterman, Phys. Rev. 21, 540 (1923).
**Estimated from square of index of refraction, said to be: $n_z = 3$
***Random Optical Density per micron layer thickness per % Concentration

TABLE III
VALUES OF PHYSICAL CONSTANTS FLUIDS

| Material | Density $\delta \times 10^3$ kg/m$^3$ | Dielectric Constant $k_e$ | Electric Breakdown $E_b$ v/m | Resistivity $\rho$ ohm-cm. | Pour Point °C. | Boiling Point °C. | Viscosity at ~20 to 25° C. cp |
|---|---|---|---|---|---|---|---|
| n-Decane | 0.73 | 1.99 | $\sim 12 \times 10^6$ | $10^{12}$ | −29.7 | 174 | 0.775 |
| n-Nonane | | | | | −53.6 | 150.8 | 0.711 |
| Iso-Nonane | | | | | −80.4 | 143.6 | |
| Hydrocarbon Oils | | 2.2 | $18 \times 10^6$ | $10^{15}$ | | | |
| Perchloroethylene | 1.630 | 2.3 | $\sim 20 \times 10^6$ | $>10^{12}$ | −22 | 121 | 0.880 |
| Butyl Acetate | 0.883 | 5.0 | $\sim 6 \times 10^6$ | | −73.5 | 126.6 | 0.74 |
| Isobutyl Acetate | 0.870 | — | | | −98. | 116.4 | |
| Di-2-Ethyl Hexyl Adipate (DOA) | 0.925 | — | | $>10^{12}$ | −60. | $210^{5mm}$ | 13.0 |
| n Octyl n Decyl Phthalate (NODP) | 0.972 | | | $>10^{12}$ | −45. | $252^{5mm}$ | 45.0 |

TABLE OF SYMBOLS

| | | |
|---|---|---|
| a | = | Ratio of length or diameter to thickness of particle |
| A | = | Area of the layer |
| $A_r$ | = | Radiation cross section average of a particle at random |
| $A_z$ | = | Radiation cross section of an asymmetric particle aligned with its long axis parallel to the light ray on the Z axix normal to the layer |
| C | = | Concentration; ratio of mass of particles to total mass of particles plus fluid per unit volume; or, Capacitance, farads |
| d | = | Layer thickness. |

-continued
TABLE OF SYMBOLS

| | | |
|---|---|---|
| $D_r$ | = | Optical Density in the random state. |
| $D_z$ | = | Optical Density produced by an Electric Field Intensity $E_z$ |
| e | = | Charge on electron = $1.60 \times 10^{-19}$ coulombs. |
| $E_b$ | = | Electric Field Intensity at breakdown f fluid. |
| $E_z$ | = | Electric Field Intensity |
| f | = | Frequency of applied voltage |
| k | = | $C/(D_r/d)$, absorption Ratio |
| $k_e$ | = | Dielectric constant of the layer |
| $k_o$ | = | $[(\delta_p/\delta_f)(\pi/a)]^{\frac{1}{2}}$; a constant |
| $k_1$ | = | $d/(Q_{rz} - 1$ |
| $k_2, k_3, k_4, k_5$ | = | constants |
| L | = | Particle length or diameter |
| m | = | an integer |
| $m_f$ | = | Mass of fluid |
| $m_p$ | = | Mass of particle |
| n | = | Index of refraction of the fluid |
| $n_p$ | = | Number of particles per unit volume |
| $n_1$ | = | Number of particles in a layer of thickness αL and unit area. |
| N | = | Number of electron charges on a particle |
| $p_c$ | = | $P_c/A$ = Reactive power loss per unit area |
| $p_r$ | = | $P_r/A$ = Resistive power loss per unit area |
| $p_t$ | = | $p_r + p_c$ = *Total power loss per unit area* |
| $P_c$ | = | Reactive power loss in the external circuit for a layer of electrooptical fluid of area A |
| $P_r$ | = | Resistive power loss in a layer of electrooptical fluid of area A |
| $q_{rz}$ | = | Electrodichroic ratio of a single particle in a dilute suspension |
| $Q_{rz}$ | = | Electrodichroic ratio of an electroordered array or particle strings in a concentrated suspension. |
| $T_r$ | = | Transmittance in the random (dark) state |
| $T_z$ | = | Transmittance in the oriented (open) state |
| $v_s$ | = | Volume per particle string from which all random particles were gathered. |
| V | = | Voltage across the layer |
| α | = | Mean spacing factor between particles in the random state |
| β | = | Mean spacing factor between particles in the particle string |
| γ | = | Mean spacing factor between particle strings in the |

TABLE OF SYMBOLS
-continued

| | | |
|---|---|---|
| | | electroordered array. |
| $\delta_f$ | = | Density of the fluid |
| $\delta_p$ | = | Density of the particle |
| $\epsilon_o$ | = | Dielectric constant of Free Space = $(1/36\pi)\,10^{-9}$ farads |
| $\epsilon_r$ | = | Absorption constant[1] of dipole suspension in random state |
| $\epsilon_z$ | = | Absorption constant[1] of dipole suspension in ordered state in an Electric Field $E_z$ |
| $\lambda$ | = | Wavelength of light |
| 1 | = | $\epsilon_r, \epsilon_z$ are absorption constants from Beers Law: $T_{r,z} = e^{-\epsilon_{r,z} m p^n p^d}$ |
| $\rho$ | = | Resistivity in ohm-m or ohm-cm, as specified. |
| $\rho'$ | = | Critical resistivity |
| $\tau$ | = | Rise time |
| $\tau_r$ | = | Relax time |
| $\psi$ | = | Number of particles in a particle string |
| — | = | Maximum value of symbol |
| ~ | = | Particular value of symbol |

The term "micrometers-$\mu$m" is the current usage adopted for $10^{-6}$ m. In the present case, the term "micron-$\mu$" is used synonymously therewith.

MATHEMATICAL PHYSICS THEORY

This section establishes the electrooptical properties of conductive particles of various dimensions, the quantum charging properties vs. dimension and the relationship between the variables in the electroordering effect. The theory is presented as an idealized model of the relationships between the variables and is not a limitation of the scope of this invention. The experimental data is interpreted by illustrative examples using the Mathematical Physics Theory.

Quantum Charged Particles

The number of electric charges Ne a conductive particle will retain depends on the electric field intensity $E_z$ concentrated at the smallest area on the particle and the electric breakdown intensity $E_b$ of the fluid in which the particle is suspended. For a rod, this is the end of the particle of thickness (L/a) and may be approximated by placing the point charge in the center of a sphere of radius (L/2a) for which the surface field intensity is:

$$E_b = Ne/4\pi\epsilon_o k_e (L/2a)^2 \qquad (1)$$

Solving (1) for L/2a:

$$L/2a = (e/4\pi\epsilon_o)^{\frac{1}{2}}(1/E_b k_e)^{\frac{1}{2}} N^{\frac{1}{2}} \qquad (2)$$

Evaluating the constant terms:

$$L/2a = 3.8 \times 10^{-5}(1/k_e E_b)^{\frac{1}{2}} N^{\frac{1}{2}} \qquad (3)$$

Example No. 1

Find the minimum width (L/a) of a conducting rod particle in butyl acetate which will support N charges; a single charge, N=1 Putting values from Table No. III into (3):

$L/a = 7.6 \times 10^{-5}(1/5 \times 16 \times 10^6)^{\frac{1}{2}} N^{\frac{1}{2}}$ $L/a = 85\, N^{\frac{1}{2}} $ Å

L/a = 85 Å for N=1 For the given value of $E_b$, no asymmetric particle with a width less than 85 Å can permanently support even 1 electron charge. However, with strong aligning fields, small particles having a width less than 85 Å may emit electrons into the fluid and acquire a temporary positive charge; but when the external electric field goes to zero, these positive charges create electric fields at the ends of the particles which exceed the electric breakdown strength of the fluid; and electrons from the fluid breakdown neutralize the particle charge. When the electric field goes to zero, the charged particles in proximity along a particle string are accelerated by mutual repulsion into random positions. This effect decreases relaxation time.

While the number of charges on a particle is directly related to the width L/a, equation (3) is true only for particles with smooth spherical edges. However, flake or rod crystals are terminated by sharp edges, points or atomic irregularities, spiral arrangements of atoms, or atomic discontinuities at their surfaces which produce local concentrations of electrical fields that vary on different particles. Submicron crystal particles have a distribution of ranges of lengths and widths and there will be a corresponding distribution of quantum charges on the particles. The number of quantum charges per particle will vary from particle to particle according to their size and shape and the electrical breakdown fields developed at their ends or edges.

Electrodichroic Ratio of Conductive Plate Suspensions

When measured in a dilute suspension, near-resonant discs comprising conductive flakes which have a large length-to-width ratio, show a $q_{rz} \approx 1.5$; which result may be derived from a simple analysis:

When resonant flakes are aligned parallel to the electric field, their cross section to ordinary light is:

$$A_z = \lambda^2/16n^2 \qquad (4)$$

When these flakes are normal to a ray of ordinary light, electrical vectors are absorbed in all directions and the cross section is $\lambda^2/8n^2$. However, since the particles are at random directions and not normal to the light; the actual absorption cross section is:

$$A_r = (\tfrac{1}{2})(\lambda^2/16n^2 + \lambda^2/8n^2) = (3/32)(\lambda^2/n^2) \qquad (5)$$

Hence:

$$\bar{q}_{rz} = A_r/A_z = (3/32)(\lambda^2/n^2)/(1/16)(\lambda^2/n^2) = 1.5 \qquad (6)$$

Electroordered Particle Arrays

The definition of Random Optical Density is:

$$\bar{D}_r = 0.43\epsilon_r m_p \bar{n}_p d \qquad (7)$$

The Maximum Optical Density $\bar{D}_r$ at maximum Concentration $\bar{C}$ is:

$$D_r = 0.43\epsilon_r m_p n_p d \qquad (8)$$

The Optical Density per $\mu$, $(D_r/d)$, is related to the Concentration C for $C << 1$ by:

$$(D_r/d) \approx kC \qquad (9)$$

For graphite particles, experimental measurements evaluated the factor k=10 per $\mu$ (k=0.10 per $\mu$ if C is in %). See Table II for values of k measured for other materials. From (7), (8) and (9):

$$\bar{D}_r/D_r = \bar{n}_p/n_p = \bar{C}/C \qquad (10)$$

By definition, for $\delta_f >> n_p m_p$:

$$m_p n_p = C\delta_f \quad (11)$$

From (7) and (11):

$$D_r/d = 0.43\epsilon_r \delta_f C \quad (12)$$

From (9) and (12), solving for $\epsilon_r$:

$$\epsilon_r = 2.30 \, k/\delta_f \quad (13)$$

Example No. 2

Experimentally, for graphite partices:
$k = 10$ per $\mu$; or $10^5$ per cm.
$\delta_f = 1.6$ gms/cm$^3$
Find: the absorption constant $\epsilon_r$:
$\epsilon_r = 2.30 \, k/\delta_f = 2.30 \times 10^5/1.6 = 1.45 \times 10^5$ cm$^2$/gm.

Equation (6) shows that near-resonant conductive flakes in dilute suspension, which are readily suspended and form clear suspensions, have too small an electrodichroic ratio to be useful for most applications.

In the present invention this limitation on the electrodichroic ratio is overcome by applying an intense electric field to a concentrated particle suspension to form an Electroordered Array having the extraordinary properties herein described.

If $\psi$ is the average number of particles in a string, then the first particle in a string of $\psi$ particles blocks the light to the particles behind it in the string. The apparent concentration of particles between the strings is decreased by the factor $\psi$, and the Optical Density in the open state is decreased by $\psi$.

The resulting electrodichroic ratio is:

$$Q_{rz} \psi \bar{q}_{rz} \quad (14)$$

In a dilute suspension, near-resonant graphite crystal flake particles have a $\bar{q}_{rz}$ of only about 1.5. However, in a concentrated suspension, these same particles may attain a $\bar{Q}_{rz}$ of up to about 40 on application of an intense electric field. This is attributed to the organization of the particles under these conditions into a well-formed Electroordered Array.

When electroordering occurs, the maximum electrodichroic ratio $\bar{Q}_{rz}$ occurs when the particle string length is maximum; for long particle strings this is limited by the layer thickness d:

$$d = \psi \beta L \quad (15)$$

FIG. 7 shows an Electroordered Array of particle strings arranged in parallel rows in a volume from which all the random partices have been gathered and no particles remain in the space between the particle strings. This is termed "a well-formed Electroordered Array" which is mathematically described:

In a zero electric field, let $\psi$ particles at random, separated by a mean distance $\alpha L$ in a volume $V_s$ be electroordered by a strong electric field to form a single particle string of $\psi$ particles. The lower portion of FIG. 7 shows the particles in random positions within a volume $V_s$. The volume $v_s$ has the dimensions $\gamma L$, $\gamma L$, and $\psi \beta L$; where $\gamma L$ is the distance between the particle strings; and $\psi \beta L$ is the length of particle strings which were assembled from the number $\psi$ of the formerly randomly positioned particles in the volume $v_s$. Then:

$$v_s \psi \beta \gamma^2 L^3 = \psi(\alpha L)^3 \quad (16)$$

From which the relative dimensions of the unit cell of a well-ordered array is:

$$\beta \gamma^2 = \alpha^3; \text{ or } \gamma = \alpha(\alpha/\beta)^{\frac{1}{2}} \quad (17)$$

The relative dimensions of the unit cell of a well-formed Electroordered Array is thus independent of particle length L, and the number of particles $\psi$ in the string.

In a random particle suspension, the number of disc particles of diameter L and thickness L/a in a unit area of thickness $\alpha L$ is:

$$n_1 = n_p \alpha L = \delta_f C \cdot \alpha L / m_p = \delta_f C \cdot \alpha L /(\delta_p \pi L^3/a) = (\alpha L)^{-2} \quad (18)$$

$$\alpha = [(\delta_p/\delta_f)(\pi/aC)]^{\frac{1}{2}} \quad (19)$$

$$\alpha = k_o C^{-\frac{1}{2}} \quad (20)$$

The limiting maximum Concentration occurs when all particles are packed together with no space between them; so that:

$$\alpha = \beta = \gamma = 1 \quad (21)$$

$C = \bar{C}$ when $\alpha = 1$, hence from (19) and (20):

$$C = k_o^3 = (\delta_p/\delta_f)(\pi/a) \quad (22)$$

and hence:

$$\alpha = (\bar{C}/C)^{\frac{1}{3}} \quad (23)$$

From (17) and (23):

$$\gamma = \beta^{-\frac{1}{2}}(\bar{C}/C)^{\frac{1}{2}} \quad (24)$$

The expressions for $\alpha$ and $\gamma$, as given by (23) and (24) are independent of the particle density, liquid density, particle length-to-width ratio, and the particle length L. For a well-formed electroordered array; since $\alpha \geq \beta$; from (17):

$$\gamma \geq \alpha \geq \gamma \quad (25)$$

When the electrical field is applied the randomly positioned particles come together to form particle strings with the distance between the particles decreased from $\alpha L$ to $\beta L$, ordered into columns a distance $\gamma L$ apart. This occurs simultaneously throughout the fluid volume, resulting in an ordered 3-dimensional particle array. This order is similar to the orientation of atoms in crystals. The most stable well-formed Electroordered Arrays appear to form in concentrated suspensions in which the particles at the centers of their electric repulsion fields are spaced equidistant from each other; so that:

$$\alpha = \beta = \gamma \quad (26)$$

FIG. 8 shows $\alpha$ versus the concentration C for the experimental data on graphite suspensions shown in FIGS. 14 to 18 inclusive. As the particle concentration is decreased, $\alpha$ is increased, and if $\beta$ is maintained constant, then by (17), $\gamma$ is increased.

From FIG. 18 it is experimentally found that for $\bar{Q}_{rz} \leq 25$:

$$d = k_1(\overline{Q}_{rz} - 1) \tag{27}$$

The linear dependence of $(\overline{Q}_{rz} - 1)$ on the layer thickness, d is caused by a limitation on the length of the particle string column extending across a layer of thickness d. Hence; for $\overline{Q}_{rz}$, from (15) and (27):

$$\beta \approx k_1 \overline{q}_{rz}/L \tag{28}$$

In FIG. 14 the straight line log-log plot for data on $E_z$ vs. $D_r/d$ for a constant $Q_{rz} = 25$ has a measured slope of 3/2; hence;

$$D_r/d = k_2 E_z^{3/2} \tag{29}$$

From the relationship between the electric field intensity $E_z$ and the interparticle spacing factors in a well-formed Electroordered Array is found, from Equations (9), (20) and (29):

$$\gamma = \alpha = \beta = k_q C^{-\frac{1}{3}} = k_o(k^{-1}D_r/d)^{-\frac{1}{3}} = k_o(k^{-1} \cdot k_2 E_z^{3/2})^{-\frac{1}{3}} \tag{30}$$

Let:

$$k_3 = k_o(k/k_2)^{\frac{1}{3}} = \overline{E}_z^{\frac{1}{2}} \tag{31}$$

Hence, in a well-formed Electroordered Array:

$$\alpha = \beta = k_3 E_z^{-\frac{1}{2}} = (\overline{E}_z/E_z)^{\frac{1}{2}} \tag{32}$$

With a more concentrated suspension, a greater electric field intensity is required to form the Electroordered Array. For example, to maintain the same $Q_{rz}$ while increasing the concentration $8\times$, the interparticle spacing is decreased by $\frac{1}{2}$, and the voltage increased by $4\times$. There is now derived a relationship between the thickness d of a layer of a concentrated particle fluid suspension and the applied voltage V, whereby a well--formed Electroordered Array having an electrodichroic ratio $\overline{O}_{rz}$ is obtained. By definition:

$$V = E_z d \tag{33}$$

From (29) and (33):

$$d = k_2^2 V^3 / D_r^2 \tag{34}$$

Example No. 3

Given:
For a near-resonant graphite flake suspension in perchloroethylene, from FIG. 18, a $\overline{Q}_{rz}$ of 25 at $E_z = 14$ v/$\mu$, and $(D_r/d) = 1$ is obtained at $d = 6.4\mu$ on a linear-linear graph, hence from (27):

$$k_1 = 6.4/(25-1) = 0.267$$

From (6):

$$\overline{q}_{rz} = 1.5$$

Electron Microscope Pictures of these flakes show them to have an average diameter $L = 0.20\mu$.
Find:
$\beta$; $\beta L$
From (28):

$$\beta = (0.267)1.5/0.20 = 2.0$$

The distance between particles on the particle string is:

$$\beta L = 0.4\mu \text{ or } 4000 \text{ Å}$$

Particles in the random state in a zero electric field have an average center-to-center distance distance $\alpha L$. On application of a strong electric field these particles gather into particle strings with a particle center-to-center distance $\beta L$, and the particle strings are ordered into parallel columns $\gamma L$ apart. When the electrical field is removed, the particles in the Electroordered Array repel each other, disperse, and again randomize. An electrical double layer around each particle provides a repulsion force field which keeps them apart. The minimum distance $(\beta-1) L$ between the proximate ends of adjacent particles, resulting from the electrical double layer, is said to be about 20 to 200 Å. However, from experimental data given herein and the Mathematical Physics Theory, $\beta$ was calculated in Example No. 3 to be $\approx 2$. and $(\beta-1) L \approx 4000$ Å. The increased distance may be due to an increased strength of the repulsion field resulting from temporary charging of the particles in the string.

As $D_r/d$ decreases from 1, by a factor of 5 to $\sim 0.20$, to maintain the same $Q_{rz}$, the electric field intensity decreased from 15 to about 5 v/$\mu$. According to Equation (20), decreasing the $D_r/d$ or Concentration C by a factor of 5 increases $\alpha$ by a factor of $5^{\frac{1}{3}} = 1.71$; and for the well-ordered array, if still formed:

$\gamma = \alpha = \beta = 2. \times 1.7 = 3.4$. According to Equation (32), when the equidistant particle spacing in a well-formed Electroordered Array is increased by a factor of 1.7 the electric field intensity is decreased by a factor of $1.71^2 \approx 3$ times; in the above case from 15 v/$\mu$ to about 5 v/$\mu$; which is in accord with the graphs shown on FIG. 14.

Example No. 4

Given:
$\delta_p = 2.25$ gms/cm³ carbon-graphite crystal flakes
$\delta_f = 1.63$ gms/cm³ perchloroethylene
Find:
$k_o$
Solution:
From the definition of $k_o$:
$k_o = [(2.25/1.63)(\pi/10)]^{\frac{1}{3}}$
$k_o = 0.757$ Example No. 5

Given:
The experimental values for the graphite flake-crystal suspension graphed in FIGS. 14 to 18.
Find:
$\overline{C}$, the Maximum Concentration and
$\overline{D}_r/d$, the Maximum Optical Density per $\mu$
Solution
From (22):
$\overline{C} = (2.26/1.60)\pi/10 = 0.443$ or 44.3%
From (9):
$\overline{D}_r/d = 0.1C\% = 4.43$ Maximum Optical Density/$\mu$
See comments after Example No. 6.

Example No. 6

Given:
$\alpha = 2$.
$D_r/d = 1$
Compute:

$\overline{C}$
Solution:
From (9) and $(D_r/d)=1$:
$\overline{C}=10\%$
From (20):
$C=\alpha^3\overline{C}=2^3.10=80\%$ FIG. 8 shows straight line log-log graphs of Equation (23) for $\alpha$ vs. C for various values of $\overline{C}$. Graph 8.1 is for $\overline{C}=44.3\%$ computed in Example No. 5, and Graph 8.2 is for $\overline{C}=80\%$ computed in Example No. 6. The difference between the values for $\overline{C}$ in Examples 4 and 5 may be explained and reconciled by observing that Equation (23) was derived using a definition of C, accurate only for $C \leq 20\%$. Hence, in actuality the Graph 8.2 is not a straight line for the larger values of C, but curves downward as shown to $\overline{C}=44.3\%$.

Example No. 7

Given:
Data from FIG. 14:
$D_r/d=0.5$
$E_z=9$
$Q_{rz}=25$
Find:
$k_2$
Solution:
From (29):
$k_2=0.5/9^{3/2}=1.86\times 10^{-2}$ Example No. 8

A voltage of 30 volts peak-to-peak is required across a layer of an Electroordered Array of thickness d; with $D_r=1.5$ and $Q_{rz}=25$. In a reflection cell this produces a closed Optical Density of 3.0; $T_r=0.1\%$; and an open Optical Density of 0.12; $T_z=75.5\%$; Transmittance Contrast Ratio $T_z/T_r=755$.
Find:
d
Solution:
From (34) and the value of $k_2$ from Example No. 7:
$d=(1.85\times 10^{-2})^2(30)^3/(1.5)^2=(3.46\times 2.7/2.25)10^{+4}$
$d=4.2\mu$ or (0.17 mils)

Example No. 9

Given:
$k_o=0.757$ from Example No. 4
From Experimental measurement
$k=10$
From Example No. 7
$k_2=1.85\times 10^{-2}$
Find:
$k_3$; $\overline{E}_z$; $\beta$ for $E_z=9$ v/$\mu$
Solution:
From (31):
$k_3=0.757 (10/1.85\times 10^{-2})^{\frac{1}{3}} \sim 7$
$\overline{E}_z=k_3^2=49$ v/$\mu$
From (32):
$\beta=(49/9)^{\frac{1}{2}}=2.1$ Example No. 10

Calculate:
The first order diffraction angle $\theta$, between a normal incident light ray of wavelength $\lambda$ in a concentrated dipole suspension in which the particles have formed an Electroordered Array having particle strings separated by a distance $\gamma L$; and given the data of Example No. 3, in which $\alpha=\beta=\gamma=2.0$.
Solution:
Referring to FIG. 20, $BC=\lambda/2n$ for reinforcement of radiation incident on particles A and B in a fluid medium of index of refraction n
$AB=\gamma L$
Hence:

$\gamma L \sin \theta = \lambda/2n$ $\sin \theta = (1/\gamma)\lambda/2nL$  (35)

now if the particles A and B are resonant, then:

$L=(\lambda/2n)$ $\sin \theta = (1/\gamma)$ $\theta = \sin^{-1}(1/\gamma)$  (36)

$\theta = \sin^{-1}(\frac{1}{2})=30°$

Colored diffraction fringes have been observed under these conditions. Conversely, if $\theta$ is measured for wavelength $\lambda$, and L is known from electron microscope pictures of the particles, then the distance $\gamma L$ between particle strings of the well-formed Electroordered Array is from (35):

$\gamma L = (\lambda/2n)/\sin \theta$  (37)

From these experimental and theoretical considerations, it may now be seen that well-formed Electroordered Arrays are formed when $\alpha=\beta=\gamma$ over a range of concentrations at various electric field intensities. For an increase in the concentration the interparticle spacing is decreased and the electric field intensity is increased to obtain a given electrodichroic ratio.

Data for Herapathite dipole suspensions is shown in FIG. 11 on a log-log graph for Electrodichroic Ratio, Rise and Relax Times versus the Random Optical Density per micron.

Herapathite particles are blade shaped crystal rods containing conductive parallel polyiodide linear molecular chains embedded in an insulating matrix; instead of the conductive flake particles as elsewhere described herein, and consequently show similarities and differences.

Dilute dipole suspensions of Herapathite, where $D_r/d \leq 0.01$, as above noted, tend to settle and coagulate. However, concentrated suspensions of Herapathite in the range 0.01 to 0.5 Optical Density per micron or greater are stable and do not settle or coagulate.

The Herapathite particles herein utilized had a length from about 1000 to 5000 Å. These Herapathite particles were sedimented at about 5000 G's for 50 to 100 minutes, and this fraction was resuspended in an insulating fluid. a Random Optical Density per micron $\approx 0.04$, the relaxation time is a minimum.

Region 2 is in the range of $0.02 > D_r/d\ 0.20$, and Region 3 is in the range of $0.2 \times D_r/d > 0.7$. These Regions are remarkable for their distinctive properties:
(1) The Electrodichroic Ratio $q_{rz}$ decreases from 6.5 to about 2 as $D_r/d$ increases to 0.20 or more at constant $E_z$.
(2) The Electrodichroic Ratio increases from 6.5 to about 15 as the Electric Field Intensity increases from 6 to 20 v/$\mu$ in the range $0.20 < D_r/d \leq 0.6$.

Such large values of $q_{rz}$ were never previously obtainable with Herapathite.

(3) The Rise Time is constant in the range $0.02 < D_r/d < 0.05$ at constant Electric Field Intensity $E_z$.

(4) The Rise Time increases with $D_r/d$ at constant Electric Field Intensity $E_z$ for $D_r/d > 0.05$.

(5) The Rise Time decreases with increased Electric Field Intensity at constant $D_r/d$ in the entire range of $D_r/d$.

(6) The Relax Time is almost constant in Regions 1 and 2 at about 25 ms, but decreases somewhat in Region 3 to 20 ms at $D_r/d = 0.7$ at constant Electric Field Intensities. An increase in Electric Field Intensity from 4 $v/\mu$ to 12 $v/\mu$ produces a small decrease in the relaxation time by about 2.5 ms throughout the entire range.

(7) The concentrated Herapathite dipole suspensions in the Regions 2 and 3 are stable.

(8) Dilute Herapathite suspensions in Region 1 are unstable and coagulate at 2 $v/\mu$. For example: with $D_r/d < 0.02$, the maximum Electrodichroic Ratio $\bar{q}_{rz}$ reaches about 6.5 at about 4 $v/\mu$. For a closed Optical Density of 3 and $q_{rz} = 6$, a layer of about 150$\mu$ thick requires 300 volts peak-to-peak, or 1.5 $v/\mu$. At greater voltages, the suspension is unstable and tends to coagulate.

(9) There does not appear to be a well defined Region 4. However, the maximum $\overline{D}_r/d \approx 2.0$ per micron for which the layer thickness is less than 1 micron; such a layer thickness may be the minimum practical since very flat surfaces are then required, obtainable only for small aperture devices and the particle concentration is large.

Comparing the Electrodichroic Ratios in Region 1 and 3, the maximum increase in the Electrodichroic Ratio is by a factor of about 2. In a concentrated Herapathite suspension at large values of Electric Field Intensity Equation (14) shows that for $\psi = 2$ particles in a string, for $Q_{rz} = 12$ and $\bar{q}_{rz} = 6$.

This decrease in relax time appears to be due to the Electric charge acquired by the Herapathite particles which causes them to be repelled from each other. In the same manner, the increase in rise time at constant $E_z$ in Regions 2 and 3 may be explained by the charging of the Herapathite dipole particles as $D_r/d$ increases since a greater electric field intensity is required to align the particles against the repulsion field of the charged particles.

The empirical-theoretical laws, derived for the highly conductive flake particles such as graphite, aluminum, etc., apply to Herapathite with modifications. Regions 1 to 4 have been identified for Herapathite suspension with similar results as to increased stability, and Electrodichroic Ratio, with increased $D_r/d$. However, for Herapathite, the Rise and Relax times versus $D_r/d$ are substantially different from that of conductive flake particles.

Equation (29) does not apply to Herapathite suspensions. A different relationship between $D_r/d$ and $E_z$ at constant $Q_{rz}$ is obtained in Regions 2 and 3 for Herapathite:

The relationship between the electric field intensity $E_z$ and $D_r/d$ at constant $Q_{rz} = 10$, and in a limited range $0.4 < D_r/d < 0.6$ $$D_r/d \approx k_2' E_z^{-1} \quad (38)$$

With Herapathite, with increased $D_r/d$, at constant electrodichroic ratio, the electric field intensity decreases according to Equation (38). For graphite, aluminum and other conductive plate particles, according to Equation (29) as $D_r/d$ increases, at constant electrodichroic ratio, the electric field intensity $E_z$ increases. These opposite results, as the particle concentration increases, may be due to:

(1) The different intrinsic Electrodichroic Ratios for needles and plates; which, in the case of Herapathite needles and graphite flakes are 6 and 1.5, respectively.

(2) An increased shorting of the Electric Field for conductive particles; compared with little or no shorting for Herapathite or other insulating dichroic crystals. For a concentrated Herapathite suspension, in the range $0.06 < (D_r/d) < 0.8$; and for $\tau > 25$ ms; the relationship between rise time, $(D_r/d)$ and $E_z$ is, empirically:

$$\tau = 2800(D_r/d)/E_z \quad (39)$$

The Critical Resistivity

Relationships relating resistivity $\rho$ of the electrooptical fluid to internal power loss and external electric power loss in the drive circuit are derived, on the assumption that the circuits are not resonant. There exists a critical resistivity $\rho'$ in which the loss in the internal circuit equals the loss in the external circuit. For $\rho < \rho'$ the internal resistive power loss exceeds the external power loss. Both the internal and external power losses are proportional to the square of the voltage and inversely proportional to the layer thickness d. As a consequence, the resistivity $\rho$ should exceed $\rho'$ by at least an order of magnitude; and the operating voltage across the electrooptical fluid layer should be as small as possible, which is a function of the dipolar suspension chosen. The internal resistive power loss becomes negligible compared to the reactive power loss in the external circuit as $\rho$ increases beyond a critical resistivity $\rho'$. For values of $\rho$ greatly exceeding $\rho'$ the external power loss is directly proportional to the frequency.

For ditigal display applications where a small power loss is required, the frequency should be as small as possible, or about 60 Hz. The following analysis derives and quantifies these relationships:

Reactive Power Loss in the External Circuit $$P_c = 2\pi f C V^2 \quad (40)$$

where $$C = \epsilon_o k_e A/d \quad (41)$$

Reactive Power supplied by external circuit loss per unit Area: $p_c$ $$p_c = (P_c/A) = 2\pi f \epsilon_o k_e V^2/d \quad (42)$$

$$k_4 = 2\pi f \epsilon_o k_e \quad (43)$$

$$p_c = k_4 V^2/d \quad (44)$$

Resistive Power Loss in the Electrooptical Fluid $$P_r = V^2/\rho d/A \quad (45)$$

$$P_r = (P_r/A) = (V^2/d)(1/\rho) \quad (46)$$

Total Power Loss per unit area $$p_t = p_c + p_r \quad (47)$$

From (44), (46) and (47):

$$p_t = (V^2/d)[(1/\rho) + k_4] \quad (48)$$

The Total Power Loss is:

$$p_t = k_5 V^2/d \quad (49)$$

or $$p_t = k_5 E^2 d \quad (50)$$

The critical resistivity is:

$$\rho' = 1/k_4 \quad (51)$$

Evaluation of $k_4$ $$k_4 = 2\pi(1/36\pi \times 10^{-9})k_e f$$

$$k_4 = 5.55 \times 10^{-11} k_e f \quad (52)$$

Given: $\rho$ in ohm-cm., to convert to ohm-meters $$\rho\text{ohm-m} = \rho\text{ohm-cm } 10^2/10^4$$

$$\rho\text{ohm-m} = \rho\text{ohm-cm} \cdot 10^{-2} \quad (53)$$

Find $p_t$ in terms of watts/cm², given d in microns.

$$p_t = (V^2/d_\mu \times 10^{-6})[(10^2/\rho_{ohm\text{-}cm}) + 5.55 \times 10^{-11} k_e f] 10^{-4} (\text{w/cm}^2) \quad (54)$$

$$p_t = (V^2/d_\mu)[(1/\rho_{ohm\text{-}cm}) + 5.55 \times 10^{-13} k_e f] 10^{+4} \text{w/cm}^2 \quad (55)$$

Evaluation of Critical Resistivity

From (55):

$$\rho'_{ohm\text{-}cm} = 1.8 \times 10^{12}/k_e f \quad (56)$$

Example No. 11

Given:
$k_e = 5$
$f = 10^2$ Hz
Find: $\rho'$
From (56):
$\rho' = 1.8 \times 10^{12}/5 \times 10^2 = 3.6 \times 10^9$ ohm-cm.

Example No. 12

Given:
$k_e = 5$
$f = 10^2$
$\rho = \rho' = 3.6 \times 10^9$ ohm-cm.
V = 15 volts square wave (30 volts peak-to-peak)
$d = 12\mu$
Find: Total Power Loss per unit area in watts/cm²
$k_4 = 1/\rho' = 2.775 \times 10^{-10}$
$k_5 = 2/\rho' = 5.55 \times 10^{-10}$
From (55):

$$\begin{aligned}
p_t &= k_5 \cdot 10^4 \, (V^2/d_\mu) \text{ w/cm}^2 \\
&= 5.55 \times 10^{-10+4} \times 225/12 \\
&= 104 \cdot 10^{-6} \text{ watts/cm}^2 \\
&= 104 \, \mu\text{w/cm}^2 \\
p_t &= k_5 \, 10^{10} \, (V^2/d_\mu) \, \mu\text{w/cm}^2
\end{aligned}$$

Example No. 13

Same as Example No. 12, except that:
For
V = 1.5 volts peak-to-peak = 0.75 volts ± square wave
$p_t = (0.75/15.0)^2 \times 104$
$p_t = 0.25 \, \mu\text{w/cm}^2$ Conclusions From (49):
1. For all V, and all d, if $\rho >> \rho'$; then $p_r << p_c$, and $p_t \approx p_c$
2. For $k_e \approx 5$ and $f \approx 10^2$ Hz $p_r << p_c$
   for $\rho >> 3.6 \times 10^9$ $$p_t = k_4(V^2/d) \quad (58)$$

3. For $p_t \approx 0.3 \, \mu\text{w/cm}^2$:
   $\rho > 10^{10}$ ohm-cm.
   $f \approx 10^2$ Hz
   $k_e \approx 2$ to 5
   $d \approx 12\mu$
   $V \approx 1.5$ volts peak-to-peak square wave
4. For $p_t \approx 1 \, \mu\text{w/cm}^2$: $10^9$ ohm-cm. is the minimum to be used.
5. $\rho = 10^{10}$ is satisfactory
6. $\rho = 10^{11}$ or $10^{12}$ ohm-cm. is unnecessarily large.
7. For a resonant circuit $p_c \to 0$ and $p_t \approx p_r$; so that $p_r \to 0$ as $\rho >> 10^{10}$ ohm-cm.
8. At $\rho = 3.6 \times 10^9$ ohm-cm
   $p_t \sim 100 \, \mu\text{w/cm}^2$ and $\rho \approx \rho'$ at 15 volts peak (30 volts peak-to-peak)

A decrease to 1.5 volts peak-to-peak for the reflective mode decreases the power $p_t$ by $(1.5/30)^2 = 1/400$ A decrease in $\rho$ to $10^8$ increases the power $p_t$ to $\sim 10 \, \mu\text{w/cm}^2$. and $\rho = 10^9$ ohm-cm.$\to p_t = 1 \, \mu\text{w/cm}^2$ internal and external power loss.

If the circuit is resonant, that is contains an inductor forming with the capacitance of the Electrodichroic layer a tuned resonant circuit, then the drive power from the external circuit $p_c$ becomes negligible compared to $p_r$: $p_c >> p_r$. Under these circumstances an increase of $\rho > 10^{10}$ ohm-cm., decreases total power loss significantly and $\rho > 10^{13}$ ohm-cm results in negligible power loss, that is about 1 nw/cm².

The Threshhold Effect

An Electrooptical fluid useful in locating a point on XY Raster in a display device has a threshhold in which the light transmittance varies from substantially zero to not more than 1% at Voltage V/2, and which increases to a maximum transmittance at Voltage V.

An extraordinarily sharp threshhold has been discovered in the graphite suspension described herein and shown in FIG. 19. In this Fig. the light transmittance varies from substantially zero ($D_r = 4.8$, or $1.6 \times 10^{-3}\%$) to 1% at V/2 = 50 volts, to $D_z = 0.2$ or 63% at V = 100 volts. These voltages are peak-to-peak for $10^3$ Hz sine wave applied across a 12 micron thickness layer of V200 fluid of Random Optical Density 0.4 per micron. In this case the Electrodichroic Ratio is $Q_{rz} = D_r/D_z = 4.8/0.2 = 24$.

The sharp threshhold effect illustrated in the transmittance-voltage curve in FIG. 19 is due to the large Electrodichroic Ratio $Q_{rz} = 24$, a closed Random Optical Density $D_r = 4.8$, and an open Optical Density $D_z \approx 0.2$ or less. As a consequence, the half-voltage appears at Optical Density $\approx 2$; about half way on the Optical Density scale. The effect is further augmented in this case because the $Q_{rz}$ vs. $E_z$ curve shown in FIG. 17 for this graphite suspension has a substantial threshhold.

If $Q_{rz}$ is directly proportional to $E_z$; $D_0$ is the threshhold Optical Density which may be between 1.3 and 2.3; and $Q_{rz}$ may be between 9 and 36; these relationships exist in any Electrooptical fluid:

$$D_z = D_0/\sqrt{Q_{rz}} \quad (59)$$

$$D_r = D_0\sqrt{Q_{rz}} \quad (60)$$

The effect is augmented for Electrodichroic compositions which show a threshhold in the $Q_{rz}$ vs. $E_z$ curve.

Regional Concentration Effects

In Dilute Suspension Region No. 1 the particles are so far apart that repulsion force fields between the particles are weaker than the random forces on the particles due to Brownian Motion, and Electroordered Arrays which may form are unstable. The repulsion force fields cannot stabilize columns of particle strings which are too far apart. Under these conditions, on applying a strong electric field intensity, and then letting the electric field decrease to zero, the particles may coagulate by forming irreversible local aggregates.

In the Medium Concentration Region No. 2 the rise and relaxation times greatly decrease as the concentration increases because a transition occurs where $\gamma < \alpha < \beta$, and $\beta$ becomes smaller.

Well formed Electroordered Arrays, comprising equidistant particles, appear to occur in the High Concentration Region No. 3. In well-formed Electroordered Arrays where $\alpha = \beta = \gamma$ the repulsion fields around each particle stabilize the positions of the particles and the columns of particle strings by a mutual and equal repulsion between all particles.

In the Extreme Concentration Region No. 4, an increase in voltage cannot be sustained as the particles are so near to each other, that shorting occurs, and the maximum particle concentration for useful operation is exceeded.

In the random state Herapathite or aluminum dipole fluids have a blue color, particularly in a thin layer where the Optical Density is less than 3. It is advantageous to employ an absorber for ultraviolet and blue light to 450 nm, such as described in my U.S. Pat. No. 3,298,959, for example; a substituted benzophenone: 2.2 dihydroxyl-3,3'-dimethoxy-benzophenone. This has the effect of decreasing the blue color to a blue-black, and increasing contrast, since at maximum transmission, there is no apparent color introduced in the visible region by such an absorber. The absorber may be included in the suspending fluid, or in the external nonglare coating, or as a separate coating layer.

The principles developed with the various materials described also apply to other conductive particles including silver, gold, platinum, titanium, tin, cadmium and other chemically stable metals, semi-metals, and conductive compounds.

This invention has established stable operational conditions and ranges for these Electrooptical dipolar fluids, in which the Electrooptical properties of the dipolar suspensions have been greatly augmented and improved, new, unusual and useful properties have been discovered.

In summary, my investigation of the electroordered effect led to the discovery of many interesting and useful novel phenomena which are unexpected and could not be predicted by any prior art knowledge. These key phenomena are:

1. Increase in the Electrodichroic Ratio

A flake particle, which has an electrodichroic ratio (a logarithmic ratio) of only 1.5 in dilute concentration, has an electrodichroic ratio of between 10–40 in medium or high concentration. This is an astounding increase of about 30 orders of magnitude of change in the light intensity.

2. Rise and Relax Time

Rise time and relaxation time are substantially decreased to a minimum in Regions 2 and 3.

3. Threshold Effect

A threshold effect which is useful in display raster scanning was discovered as shown in FIG. Number 19. With this effect the light transmittance remains near zero at between zero and half voltage and the light transmittance rapidly increases between half and the full voltage required for maximum light transmittance.

4. Remanence

These dipolar suspensions have rapid rise times and slow relaxation times. They are useful for displays. They save energy because the voltage need be on for only a small portion of the duty cycle.

5. New and Improved Compositions

New electrooptical dipole compositions exhibiting the electroordering effect were discovered. Surfactants such as lecithin were found useful for the suspension of dipolar particle compositions; compositions using surfactant plasticizers and surfactant polymers were also useful for this purpose.

6. Silvery-Dark Reflectance

A dipole suspension having large flakes $L > \lambda/2n$ was discovered which has diffuse silvery reflectivity in the random state and becomes black on partial alignment with only 20% of the voltage required for full alignment. This discovery is based upon the stability of a high concentration of large size charged particles. Because only relatively small voltages are used, an electroordered array does not form. This silvery-dark reflective characteristic dipole suspension is the reverse of the dark-transparent characteristic of the other dipole suspensions heretofore described. The electric power required to actuate the display is about 25 times smaller which means longer life for battery operated displays. These properties are very useful for displays.

7. Process for Increasing Resistivity of a Dipole Suspension

A process for increasing the resistivity of a dipole suspension utilizing centrifugation is more efficient and less expensive than the method using evaporation described in my U.S. Pat. No. 3,625,869 entitled "Method of Increasing the Resistivity of a Dipole Suspension".

The data presented herein are illustrative, but do not limit the broad scope of the invention.

What I claim as new is:

1. An electrodichroic composition of matter comprising a fluid suspension of asymmetric electrically charged conductive particles in an insulating surfactant fluid, said electrically charged particles producing an electrostatic field mutually repelling said particles, said fluid suspension having a resistivity exceeding $10^{10}$ ohm-cm, said fluid suspension having a layer thickness of 3–50 $\mu$m, said fluid suspension layer having a particle concentration such that the ratio of random optical density to thickness in micrometers is between 0.08 and 0.8, a constant amplitude alternating electric voltage, said voltage being applied across said layer, said voltage being such as to produce an electrodichroic ratio of 6 to 40, where said particles form an electroordered array without particle coagulation in said fluid.

2. A composition of matter according to claim 1 in which the said particle concentration is in the medium concentration region.

3. A composition of matter according to claim 1 in which the said particle concentration is in the high concentration region.

4. A particle suspension according to claim 1 in which the particles belong to the class consisting of the metals aluminum, chromium, titanium and tin.

5. A particle suspension according to claim 1 in which the particles belong to the class consisting of the semiconductors carbon (graphite), molybdenum disulfide, silicon and germanium.

6. A particle suspension according to claim 1 in which the particles are dichroic crystals.

7. A composition according to claim 1 in which the particles are dichroic crystals of Herapathite.

8. A composition of matter according to claim 1, said particles having a major length L and separated by a distance exceeding L and less than 5L.

9. A composition of matter according to claim 1 in which the particles are near-resonant asymmetric dipoles, in which the major length is $\lambda/4n < L < \lambda/n$.

10. A composition of matter according to claim 1 in which the particles are sub-resonant asymmetric dipoles in which the major length $L < \lambda/2n$.

11. A composition of matter according to claim 1 in which the particles are plates.

12. A composition of matter according to claim 1 in which the particles are rods.

13. A composition of matter according to claim 1 in which the particles are graphite and in which the insulating surfactant suspending fluid comprises perchloroethylene 85 parts; an ester from 5 to 15 parts; and a surfactant from 0 to 5 parts.

14. A composition of matter according to claim 1 in which the insulating surfactant suspending fluid contains near-resonant graphite flake particles whose major length L varies from 2000 to 7000 Å, the fluid is perchloroethylene about 85 parts, an ester about 10 parts and a silicone about 5 parts; the optical density per $\mu$m varies from 0.08 to 1.3; the composition is in a layer from 3 to 100 $\mu$m thickness and in which an electroordered array is formed at between 2 and 20 volts/$\mu$m.

15. A composition of matter according to claim 1 in which the insulating surfactant suspending fluid contains near-resonant graphite flake particles whose major length L varies from 2000 to 7000 Å, the fluid is perchloroethylene about 85 parts, an ester about 10 parts, a surfactant about 5 parts; the optical density per $\mu$m varies from 0.08 to 1.3; the composition is in a layer from 2 to 100 $\mu$m thickness and in which an electroordered array is formed at between 2 and 10 volts/$\mu$m, wherein the rise time is of the order of 15 to 20 ms at 6 to 10 volts/$\mu$m at a $D_r/d$ of 0.16 to 1.3 and wherein the relax time is about 20 ms and the layer thickness is from 3 to 25 $\mu$m.

16. A composition of matter according to claim 1 in which the insulating surfactant suspending fluid is selected from the class consisting of aliphatics, esters, platicizers, halogenated aliphatics, halogenated aromatics, silicones and fluorocarbons.

17. A composition of matter according to claim 1 in which said particles are multi-resonant having a length $l \gg > \lambda/2n$, said particles having one or a few negative charges whereby the relaxation time is minimized and is of the order of 100 ms.

18. A composition of matter according to claim 1 in which the insulating surfactant suspending fluid contains from 0.1 to 5% nitrocellulose and comprises a mixture of lower and higher esters.

19. A composition of matter according to claim 1 in which the insulating surfactant suspending fluid comprises 0.1 to 5% of an electron donating polymer and fluids selected from the class consisting of the lower esters, isobutyl acetate, isopentyl acetate, and the higher esters are selected from the class consisting of pentyl to decyl acetate, whereby the negative charge comprises one or a few charges per particle and the relaxation time is a minimum.

20. A composition of matter according to claim 1 in which the particles are metal flakes having a thickness of 50 to 200 Å and a length of from 0.2 to 4.0 $\mu$m.

21. A composition of matter according to claim 1 in which the particles are aluminum which form an electroordered array by an electric field intensity of 0.1 to 1.0 volts/$\mu$m peak to peak at a frequency exceeding 30 Hz and in which the electrodichroic ratio is between 10 and 20.

22. A remanent electrodichroic composition of matter according to claim 1 in which the particles are conducting flakes, are multi-resonant, have a major length L substantially greater than $\lambda/2n$, and each have either multiple positive or negative charges, whereby said suspension has a relaxation time substantially greater than 1 second.

23. A remanent electrodichroic composition of matter according to claim 1 wherein the insulating surfactant suspending fluid contains 0.01 to 5% polystyrene.

24. An electrodichroic composition of matter according to claim 1 in which said layer is approximately opaque to light in zero voltage and approximately transparent to light when said voltage is applied.

25. A composition of matter according to claim 1 in which said particles each have one or more quanta of the same electric charges either positive or negative.

26. A composition of matter according to claim 1 in which the insulating surfactant suspending fluid is selected from a plasticizer of the class consisting of aliphatic hydrocarbons, esters, halogenated aliphatic hydrocarbons, aromatics, silicones and fluorocarbons, and in which the said aliphatics are selected from the class consisting of 6 to 15 carbon atoms.

27. A composition of matter according to claim 1 in which the insulating surfactant suspending fluid is selected from a plasticizer of the class consisting of aliphatic hydrocarbons, esters, halogenated aliphatic hydrocarbons, halogenated aromatics, silicones and fluourocarbons and in which the esters are selected from the class consisting of butyl to decyl acetate, propionate, or butyrate, the corresponding isoesters such as isopentyl isobutyrate, and plasticizers such as normal-octyl normal-decyl phthalate.

28. An electrodichroic composition of matter according to claim 1, said composition being in a layer showing a threshold effect, in which the electrodichroic ratio $Q_{rz}$ is 9 to 40; the random optical density $D_r \simeq D_o\sqrt{Q_{RZ}}$ with zero voltage across said layer; the minimum optical density $D_z \simeq D_o/\sqrt{Q_{rz}}$ with voltage V applied across said layer, the median optical density $D_o$ at voltage V/2 is between the limits $1.3 < D_o < 2.3$, the particles approach a well formed electroordered array as the applied voltage is increased to V.

29. A composition of matter according to claim 1 in which the insulating surfactant suspending fluid contains near-resonant graphite flake particles whose major length L varies from 2000 to 7000 Å, the said insulating surfactant suspending fluid comprises an aliphatic fluid about 75 to 99.5 parts, a mineral oil plasticizer 1 to 15 parts, a surfactant lecithin 0.1 to 10 parts, and in which said aliphatic fluid is chosen from the class consisting of nonane, decane and undecane.

30. An electrodichroic composition of matter according to claim 1 in which the insulating surfactant suspending fluid contains a platicizer from 0.1 to 15%, said plasticizer being a surfactant for said particles.

31. An electrodichroic composition of matter according to claim 1 in which the insulating surfactant suspending fluid contains a polymer from 0.1% to 3%, said polymer being a surfactant for said particles.

* * * * *